US009080231B2

(12) United States Patent
Fujii et al.

(10) Patent No.: US 9,080,231 B2
(45) Date of Patent: Jul. 14, 2015

(54) HOT-DIPPED STEEL AND METHOD OF PRODUCING SAME

(75) Inventors: Shiro Fujii, Chiba (JP); Yoshikazu Yamanaka, Osaka (JP); Nobuki Shiragaki, Hyogo (JP); Hiroshi Kanai, Chiba (JP); Nobuyuki Shimoda, Tokyo (JP); Yasuhide Morimoto, Tokyo (JP); Yoshihiro Suemune, Tokyo (JP); Tooru Oohashi, Tokyo (JP)

(73) Assignees: NIPPON STEEL & SUMIKIN COATED SHEET CORPORATION, Tokyo (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/513,025

(22) PCT Filed: Feb. 17, 2011

(86) PCT No.: PCT/JP2011/053426

§ 371 (c)(1), (2), (4) Date: Jul. 27, 2012

(87) PCT Pub. No.: WO2011/102434

PCT Pub. Date: Aug. 25, 2011

(65) Prior Publication Data

US 2012/0282488 A1 Nov. 8, 2012

(30) Foreign Application Priority Data

Feb. 18, 2010 (JP) ................................ 2010-033502

(51) Int. Cl.

*B32B 15/01* (2006.01)
*B32B 15/18* (2006.01)

(Continued)

(52) U.S. Cl.

CPC ... *C23C 2/06* (2013.01); *B05D 1/18* (2013.01); *C23C 2/12* (2013.01); *C23C 28/021* (2013.01);

(Continued)

(58) Field of Classification Search

CPC .............. C23C 2/00; C23C 2/04; C23C 2/06; C23C 2/12; C23C 28/021; C23C 28/023; C23C 30/00; C23C 30/005; Y10T 428/12924; Y10T 428/12757; Y10T 428/12764; Y10T 428/12799; Y10T 428/12972; Y10T 428/12979; Y10T 428/12993; Y10T 428/265

USPC ......... 428/659, 658, 654, 650, 666, 667, 684, 428/685, 687, 336, 653

See application file for complete search history.

(56) References Cited

U.S. PATENT DOCUMENTS 6,465,114 B1 * 10/2002 Honda et al. .................. 428/659
6,635,359 B1 * 10/2003 Kurosaki et al. .............. 428/653

(Continued)

FOREIGN PATENT DOCUMENTS

CN 1369020 A 9/2002
JP 9-316618 A 12/1997

(Continued)

OTHER PUBLICATIONS

Machine Translation, Yoshizaki et al., JP 2000-328214, Nov. 2000.*

(Continued)

*Primary Examiner* — Michael E La Villa
(74) *Attorney, Agent, or Firm* — Cheng Law Group, PLLC

(57) ABSTRACT

The present invention provides a hot-dipped steel 1 that demonstrates favorable corrosion resistance and formability, and has a favorable appearance of a plating layer. The hot-dipped steel of the present invention includes a steel substrate formed thereon with an aluminum-zinc alloy plating layer. The aluminum-zinc alloy plating layer contains Al, Zn, Si and Mg as constituent elements thereof and the Mg content is 0.1% to 10% by weight. The aluminum-zinc alloy plating layer contains 0.2% to 15% by volume of an Si—Mg phase, and the weight ratio of Mg in the Si—Mg phase to the total weight of Mg is 3% or more.

14 Claims, 6 Drawing Sheets

(51) Int. Cl.

| | |
|---|---|
| ***B32B 15/20*** | (2006.01) |
| ***B05D 1/18*** | (2006.01) |
| ***B05D 3/04*** | (2006.01) |
| ***C23C 2/02*** | (2006.01) |
| ***C23C 2/04*** | (2006.01) |
| ***C23C 2/06*** | (2006.01) |
| ***C23C 2/12*** | (2006.01) |
| ***C23C 30/00*** | (2006.01) |
| ***C23C 28/02*** | (2006.01) |

(52) U.S. Cl.

CPC ............... *C23C 28/023* (2013.01); *C23C 30/00* (2013.01); *C23C 30/005* (2013.01); *Y10T 428/12757* (2015.01); *Y10T 428/12764* (2015.01); *Y10T 428/12799* (2015.01); *Y10T 428/12924* (2015.01); *Y10T 428/12972* (2015.01); *Y10T 428/12979* (2015.01); *Y10T 428/12993* (2015.01); *Y10T 428/265* (2015.01)

(56) References Cited

U.S. PATENT DOCUMENTS

| | | | | |
|---|---|---|---|---|
| 7,875,363 | B2 | 1/2011 | Okai et al. | |
| 2006/0073355 | A1 * | 4/2006 | Honda et al. | 428/659 |
| 2009/0269611 | A1 | 10/2009 | Liu et al. | |
| 2009/0274926 | A1 | 11/2009 | Okai et al. | |

FOREIGN PATENT DOCUMENTS

| | | | |
|---|---|---|---|
| JP | 11-279735 | A | 10/1999 |
| JP | 2000-328214 | A | 11/2000 |
| JP | 3282501 | B2 | 3/2002 |
| JP | 2002-322527 | * | 11/2002 |
| JP | 3718479 | B2 | 11/2005 |
| JP | 2007-284718 | A | 11/2007 |
| TW | 2007-28500 | A | 8/2007 |
| WO | WO 2008/025066 | A1 | 3/2008 |
| WO | WO 2009/111842 | * | 9/2009 |
| WO | WO 2009/111843 | * | 9/2009 |

OTHER PUBLICATIONS

Machine Translation, Endo, et al., JP 2002-322527, Nov. 2002.*

G. H. Li, et al., "Magnesium Silicide Intermetallic Alloys," in Metallurgical Transactions A, vol. 24A, Nov. 1993, pp. 2383-2391.*

James Friauf, "The crystal structure of MgZn2," Caltech Thesis Citation, dated Jan. 1926, downloaded from http://thesis.library.caltech.edu on May 2, 2014 (four pages).*

International Search Report for the Application No. PCT/JP2011/053426 mailed May 10, 2011.

Taiwanese Office Action for the Application No. 100105485 dated Dec. 10, 2013.

Notification of the First Office Action for the Application No. 201180004914.X from State Intellectual Property Office of People's Republic of China dated Aug. 26, 2013.

* cited by examiner

HOT-DIPPED STEEL AND METHOD OF PRODUCING SAME

TECHNICAL FIELD

The present invention relates to a hot-dipped steel and a method of producing the same.

BACKGROUND ART

Hot-dipped Zn—Al-plated steel have conventionally been widely used in applications such as construction materials, materials for automobiles and materials for home appliances. In particular, since high aluminum (25% to 75% by weight)-zinc alloy-plated sheet steel, as represented by 55% aluminum-zinc alloy-plated sheet steel (Galvalume™ sheet steel), has superior corrosion resistance in comparison with ordinary hot-dipped sheet steel, its demand continues to increase. In addition, in response to recent growing demands for further improvement of corrosion resistance and workability of construction materials in particular, the corrosion resistance of hot-dipped Zn—Al-based steel has been improved through the addition of Mg and the like to the plating layer (see PTL 1 to 4).

However, in the case of high aluminum-zinc alloy-plated sheet steel containing Mg, wrinkles easily form in the surface of the plating layer resulting in the problem of poor appearance of the plated surface. Moreover, since sharp protrusions occur in the surface of the plating layer due to this wrinkling, in the case of forming a chemical conversion treatment layer by carrying out chemical conversion on the plating layer or forming a coating layer by applying a coating material and the like, the thickness of the chemical conversion layer or coating layer easily becomes uneven. Consequently, there is the problem of coating and the like being unable to adequately demonstrate improvement of corrosion resistance of plated sheet steel.

For example, PTL 1 discloses an hot-dipped Al-based Al—Si—Mg—Zn-plated sheet steel having on the surface thereof a hot-dipped plating layer containing, as percentages by weight, 3% to 13% Si, 2% to 8% Mg and 2% to 10% Zn, with the remainder consisting of Al and unavoidable impurities. PTL 1 discloses that the hot-dipped plating layer further contains 0.002% to 0.08% Be and 0% to 0.1% Sr, contains 3% to 13% Si, 2% to 8% Mg, 2% to 10% Zn, 0.003% to 0.05% Be and 0% to 0.1% Sr, contains 3% to 13% Si, 2% to 8% Mg, 2% to 10% Zn, 0% to 0.003% Be and 0.07% to 1.7% Sr, contains 3% to 13% Si, 2% to 8% Mg, 2% to 10% Zn, 0% to 0.003% Be and 0.1% to 1.0% Sr, contains 3% to 13% Si, 2% to 8% Mg, 2% to 10% Zn, 0.003% to 0.08% Be and 0.1% to 1.7% Sr, or contains 3% to 13% Si, 2% to 8% Mg, 2% to 10% Zn, 0.003% to 0.05% Be and 0.1% to 1.0% Sr.

In the technology disclosed in this PTL 1, although corrosion resistance of a hot-dipped steel is attempted to be improved by adding Mg to the plating layer, wrinkles easily form in the plating layer due to the addition of Mg. Although it is also described in PTL 1 that wrinkling is inhibited as a result of inhibiting oxidation of Mg by adding Sr or Be to the plating layer, inhibition of wrinkling is not adequate.

Wrinkles formed in the plating layer in this manner are difficult to be adequately removed even by temper rolling treatment and the like, and cause the appearance of hot-dipped steel to be impaired.

CITATION LIST

Patent Literature

PTL 1: Japanese Patent Application Publication No. H11-279735

PTL 2: Japanese Patent Publication No. 3718979

PTL 3: WO 2008/025066

PTL 4: Japanese Patent Application Publication No. 2007-284718

SUMMARY OF INVENTION

Technical Problem

With the foregoing in view, an object of the present invention is to provide a hot-dipped steel, which demonstrates favorable corrosion resistance and workability, and has a favorable appearance of a plating layer, and a method of producing the same.

Solution to Problem

The inventors of the present invention discussed the following matters regarding the above-mentioned problems. During hot-dip plating treatment using a hot-dip plating bath containing Mg, since Mg is easily oxidized in comparison with other elements that compose the plating layer, Mg reacts with oxygen in the air on the surface layer of the hot-dip plating metal adhered to the steel substrate, resulting in the formation of Mg-based oxides. Accompanying this, Mg concentrates on the surface layer of the hot-dip plating metal, and accelerates the formation of an Mg-based oxide film (film composed of metal oxides including Mg) on the surface layer of this hot-dip plating metal. As the hot-dip plating metal cools and solidifies, since the Mg-based oxide film is formed before solidification inside the hot-dip plating metal is completed, a difference in fluidity occurs between the surface layer of the hot-dip plating metal and the inside thereof. Consequently, even if the inside of the hot-dip plating metal is still fluid, the Mg-based oxide film of the surface layer is no longer able to follow that flow, and wrinkling and running are thought to occur as a result thereof.

Therefore, the inventors of the present invention conducted extensive studies to inhibit differences in fluidity within the hot-dip plating metal during hot-dip plating treatment as described above while ensuring favorable corrosion resistance and workability of a hot-dipped steel, thereby leading to completion of the present invention.

The hot-dipped steel according to the present invention includes a steel substrate formed on its surface with an aluminum-zinc alloy plating layer. The aluminum-zinc alloy plating layer contains Al, Zn, Si and Mg as constituent elements thereof and the Mg content is 0.1% by weight to 10% by weight. The aluminum-zinc alloy plating layer contains 0.2% to 15% by volume of an Si—Mg phase. The weight ratio of Mg in the Si—Mg phase to the total weight of Mg is 3% or more.

In the hot-dipped steel according to the present invention, the aluminum-zinc alloy plating layer is preferred to include less than 60% by weight of Mg in any region having a size of 4 mm in diameter and a depth of 50 nm in the outermost layer of the aluminum-zinc alloy plating layer having a depth of 50 nm.

Namely, no matter what region having a size of 4 mm in diameter and depth of 50 nm at any location in an outermost layer is selected, the average value of the Mg content in this region is preferably less than 60% by weight.

In the hot-dipped steel according to the present invention, the aluminum-zinc alloy plating layer preferably further contains 0.02% to 1.0% by weight of Cr as a constituent element thereof.

Preferably, the aluminum-zinc alloy plating layer has the outermost layer of 50 nm depth in which 100 ppm to 500 ppm by weight of Cr is contained.

In the hot-dipped steel according to the present invention, an alloy layer containing Al and Cr is preferably interposed between the aluminum-zinc alloy plating layer and the steel substrate. The alloy layer has a weight proportion of Cr which gives a ratio of 2 to 5 relative to a weight proportion of Cr in the aluminum-zinc alloy plating layer.

In the hot-dipped steel according to the present invention, preferably, the aluminum-zinc alloy plating layer contains the Si—Mg phase in its surface at a surface area ratio of 30% or less.

In the hot-dipped steel according to the present invention, the aluminum-zinc alloy plating layer is preferred to contains 25% to 75% by weight of Al, and 0.5% to 10% by weight, based on Al, of Si. The weight ratio of Si to Mg is preferably between 100:50 and 100:300.

In the hot-dipped steel according to the present invention, the aluminum-zinc alloy plating layer is preferred to further contain 1 ppm to 1000 ppm by weight of Sr.

In the hot-dipped steel according to the present invention, the aluminum-zinc alloy plating layer preferably further contains at least one of Ti and B within a range of 0.0005% to 0.1% by weight.

The method of producing the hot-dipped steel according to the present invention comprises:

preparing a hot-dip plating bath having an alloy composition containing,

25% to 75% by weight of Al,
0.1% to 10% by weight of Mg,
0.02% to 1.0% by weight of Cr,
0.5% to 10% by weight, based on Al, of Si,
1 ppm to 1000 ppm by weight of Sr,
0.1% to 1.0% by weight of Fe,
the remainder being Zn, and Si being contained at a weight ratio of 100:50 to 100:300 relative to Mg;

passing a steel substrate through this hot-dip plating bath to deposit a hot-dip plating metal on the surface thereof; and solidifying the hot-dip plating metal to form an aluminum-zinc alloy plating layer on the surface of the steel substrate.

In the method of producing the hot-dipped steel according to the present invention, the hot-dip plating bath preferably further contains 100 ppm to 5000 ppm by weight of Ca.

In the method of producing the hot-dipped steel according to the present invention, the hot-dip plating bath preferably further contains at least one of Ti and B within a range of 0.0005% to 0.1% by weight.

In the method of producing the hot-dipped steel according to the present invention, the hot-dip plating bath is maintained at a temperature not exceeding by 40° C. above a solidification starting temperature of the alloy composition.

In the method of producing the hot-dipped steel according to the present invention, the steel substrate is preferably transferred from the hot-dip plating bath to a non-oxidative atmosphere or low oxidative atmosphere, after which a gas wiping process is made to adjust an amount of the hot-dip plating metal deposited on the steel substrate in the non-oxidative atmosphere or low oxidative atmosphere before the hot-dip plating metal is solidified.

The method of producing the hot-dipped steel according to the present invention preferably includes a step of holding the steel substrate coated with the aluminum-zinc alloy plating layer, at a holding temperature t (° C.) for a holding time y (hr) defined by the following formula (1).

$$5.0\times10^{22}\times t^{-10.0}\leq y\leq7.0\times10^{24}\times t^{-10.0} \quad (1)$$

(where $150\leq t\leq250$)

Advantageous Effects of Invention

According to the present invention, the hot-dipped steel is obtained that demonstrates favorable corrosion resistance and a favorable appearance for the surface of the plating layer by inhibiting the formation of wrinkles therein.

DESCRIPTION OF EMBODIMENTS

Figure 1:
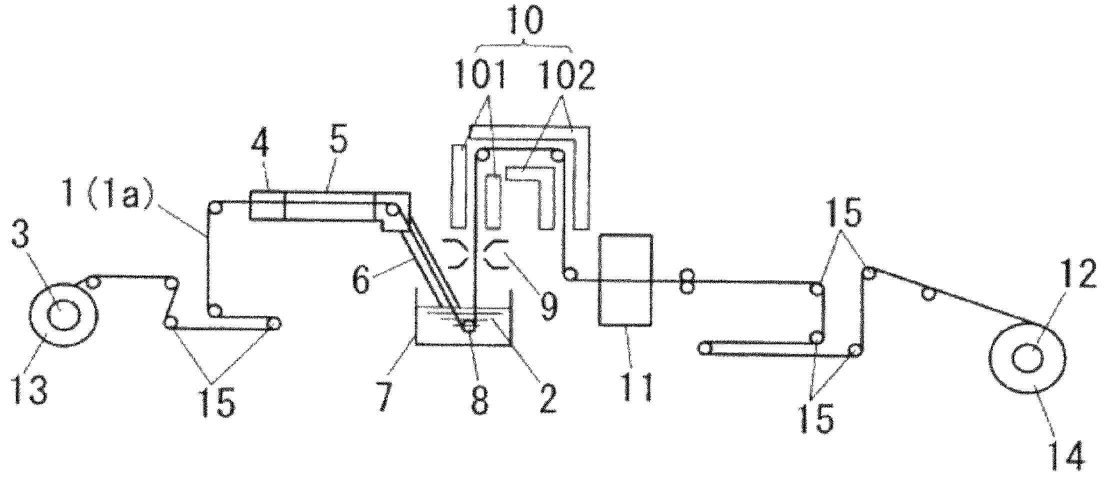
FIG. 1 is a schematic diagram showing an example of a hot-dip plating equipment in an embodiment of the present invention.

The following provides an explanation of embodiments of the present invention.

[Hot-Dipped Steel]

The hot-dipped steel according to the present embodiment is obtained by forming an aluminum-zinc alloy plating layer (to be referred to as the plating layer) onto the surface of a steel substrate 1. Examples of the steel substrate 1 include various members such as thin sheet steel, thick sheet steel, die steel, steep pipe or steel wire. In other words, there are no particular limitations on the form of the steel substrate 1. The plating layer is formed by hot-dipping treatment.

The plating layer contains Al, Zn, Si and Mg as constituent elements thereof. The Mg content of the plating layer is 0.1% to 10% by weight. Consequently, in addition to corrosion resistance of the surface of the plating layer being improved by Al, due to sacrificial corrosion protective action by Zn, edge creep is inhibited on cut ends of the hot-dipped steel, thereby imparting a high level of corrosion resistance to the hot-dipped steel. Moreover, excessive alloying between the Al and steel substrate is inhibited by Si, thereby preventing an alloy layer (to be subsequently described) interposed between the plating layer and the steel substrate from impairing workability of the hot-dipped steel. Moreover, as a result of the plating layer containing Mg, which is a less noble metal than Zn, the sacrificial corrosion preventive action of the plating layer is enhanced, thereby further improving the corrosion resistance of the hot-dipped steel.

The plating layer contains 0.2% to 15% by volume of an Si—Mg phase. The Si—Mg phase is a phase composed of an intermetallic compound of Si and Mg, and is dispersed in the plating layer.

The volume percentage of the Si—Mg phase in the plating layer is equal to the percent area of the Si—Mg phase in a cross-section in the case of cutting the plating layer in the direction of thickness thereof. The Si—Mg phase in a cross-section of the plating layer can be clearly confirmed by observing with an electron microscope. Consequently, the volume percentage of the Si—Mg phase in the plating layer can be measured indirectly by measuring the percent area of the Si—Mg phase in a cross-section.

The formation of wrinkles in the plating layer is inhibited to a greater degree the higher the volume percentage of the Si—Mg phase in the plating layer. This is thought to be due to the Si—Mg phase precipitating in the hot-dip plating metal before the hot-dip plating metal completely solidifies, and this Si—Mg phase inhibiting flow of the hot-dip plating metal in a process by which the plating layer is formed as a result of the hot-dip plating metal being cooled during production of a hot-dipped steel. The volume percentage of this Si—Mg phase is more preferably 0.1% to 20%, even more preferably 0.2% to 10% and particularly preferably 0.4% to 5%.

The plating layer is composed of the Si—Mg phase and another phase containing Zn and Al. The phase containing Zn and Al is mainly composed of an α-Al phase (dendritic structure) and a Zn—Al—Mg eutectic phase (interdendritic structure). The phase that contains Zn and Al can further contain various types of phases such as a phase composed of Mg—$Zn_2$ (Mg—$Zn_2$ phase), phase composed of Si (Si phase) or phase composed of an Fe—Al intermetallic compound (Fe—Al phase) corresponding to the composition of the plating layer. The phase that contains Zn and Al constitutes the portion of the plating layer remaining after excluding the Si—Mg phase. Thus, the volume percentage of the phase that contains Zn and Al in the plating layer is within the range of 99.9% to 60%, preferably within the range of 99.9% to 80%, more preferably within the range of 99.8% to 90%, and particularly preferably within the range of 99.6% to 95%.

The weight ratio of Mg in the Si—Mg phase based on the total weight of Mg in the plating layer is 1% by weight or more. Mg not contained in the Si—Mg phase is contained in the phase that contains Zn and Al. In the phase that contains Zn and Al, Mg is contained in, for example, an α-Al phase, Zn—Al—Mg eutectic phase, Mg—$Zn_2$ phase or Mg-containing oxide film formed on the plating surface. The Mg is in solid solution in the α-Al phase in the case it is contained in an α-Al phase.

The weight ratio of Mg in the Si—Mg phase based on the total weight of Mg in the plating layer can be calculated by considering the Si—Mg phase to have the stoichiometric composition of $Mg_2Si$. Furthermore, although the composite ratios of Si and Mg in the Si—Mg phase may actually vary slightly from the stoichiometric composition since there is the possibility of the Si—Mg phase containing small amounts of elements other than Si and Mg such as Al, Zn, Cr or Fe, it is extremely difficult to precisely determine the amount of Mg in the Si—Mg phase when these are taken into consideration. Consequently, in the present invention, when determining the weight ratio of Mg in the Si—Mg phase based on the total weight of Mg in the plating layer, the Si—Mg phase is considered to have the stoichiometric composition of $Mg_2Si$ as previously described.

The weight ratio of Mg in the Si—Mg phase based on the total weight of Mg in the plating layer can be calculated according to the following formula (1).

$$R=A/(M\times CMG/100)\times 100 \quad (1)$$

R represents the weight ratio of Mg in the Si—Mg phase based on the total weight of Mg in the plating layer (wt %), A represents the Mg content contained in the Si—Mg phase of the plating layer per unit surface area as viewed overhead of the plating layer (g/$m^2$) M represents the weight of the plating layer per unit surface area as viewed overhead of the plating layer (g/$m^2$), and CMG represents the total content of Mg in the plating layer (wt %).

A can be calculated from the following formula (2).

$$A=V_2\times\rho_2\times\alpha \quad (2)$$

$V_2$ represents the volume of the Si—Mg phase in the plating layer per unit surface area as viewed overhead of the plating layer ($m^3/m^2$). $\rho_2$ represents the density of the Si—Mg phase, and the value thereof is $1.94\times10^6$ (g/$m^3$). α represents the weight ratio of Mg contained in the Si—Mg phase, and the value thereof is 0.63.

$V_2$ can be calculated from the following formula (3).

$$V_2=V_1\times R_2/100 \quad (3)$$

$V_1$ represents the total volume of the plating layer per unit surface area as viewed overhead of the plating layer ($m^3/m^2$), and $R_2$ represents the volume percentage of the Si—Mg phase in the plating layer (vol %).

$V_1$ can be calculated from the following formula (4).

$$V_1=M/\rho_1 \quad (4)$$

$\rho_1$ represents the density of the entire plating layer (g/$m^3$). The value of $\rho_1$ can be calculated by weighted averaging density of the constituent elements of the plating layer at normal temperature based on the composition of the plating layer.

In the present embodiment, Mg in the plating layer is contained in the Si—Mg phase at a high ratio as previously described. Consequently, the amount of Mg present in the surface layer of the plating layer decreases, and the formation of an Mg-based oxide film in the surface layer of the plating layer is inhibited as a result thereof. Thus, wrinkling of the plating layer caused by the Mg-based oxide film is inhibited. The formation of wrinkles is inhibited to a greater degree the higher the percentage of Mg in the Si—Mg phase based on the total amount of Mg. This percentage is more preferably 5% by weight or more, even more preferably 20% by weight or more, and particularly preferably 50% by weight or more. There are no particular limitations on the upper limit of the percentage of Mg in the Si—Mg phase based on the total amount of Mg, and this percentage may be 100% by weight.

Mg content in any region having a size of 4 mm in diameter and a depth of 50 nm in the outermost layer of the plating layer having a depth of 50 nm is preferably less than 60% by weight. Mg content in this outermost layer of the plating layer is measured by glow discharge optical emission spectroscopy (GD-OES).

Wrinkling caused by an Mg-based oxide film is inhibited to a greater degree the lower the Mg content in the outermost layer of the plating layer. This Mg content is preferably less than 40% by weight, more preferably less than 20% by weight, and particularly preferably less than 10% by weight.

Preferably, the plating layer contains the Si—Mg phase in its surface at a surface area ratio of 30% or less. When the Si—Mg phase is present in the plating layer, the Si—Mg phase easily becomes thin and is formed in the form of a mesh on the surface of the plating layer, and the appearance of the plating layer changes if the area ratio of the Si—Mg phase is large. In the case the distribution of the Si—Mg phase on the plating surface is uneven, visual differences in luster are observed in the appearance of the plating layer. This uneven luster constitutes an appearance defect referred to as running. If the plating layer contains the Si—Mg phase in its surface at a surface area ratio of 30% or less, running is inhibited and the appearance of the plating layer improves. Moreover, a low area ratio of the Si—Mg phase on the surface of the plating layer is also effective for maintaining corrosion resistance of the plating layer over a long period of time. If precipitation of the Si—Mg phase onto the surface of the plating layer is inhibited, the amount of the Si—Mg phase that precipitates inside the plating layer increases relative thereto. Consequently, the amount of Mg inside the plating layer increases, the sacrificial corrosion preventive action of Mg is demonstrated in the plating layer over a long period of time as a result thereof, and the corrosion resistance of the plating layer is therefore maintained over a long period of time. In order to improve the appearance of the plating layer and maintain corrosion resistance over a long period of time, the plating layer contains the Si—Mg phase in its surface at a surface area ratio of preferably 20% or less, more preferably 10% or less and particularly preferably 5% or less.

The content of Mg in the plating layer is within the range of 0.1% to 10% by weight as previously described. If the Mg content is less than 0.1% by weight or more, corrosion resistance of the plating layer is no longer adequately ensured. If the content exceeds 10% by weight, not only does the action of improving corrosion resistance become saturated, but dross easily forms in the hot-dip plating bath during production of hot-dipped steel. This Mg content is more preferably 0.5% by weight or more and even more preferably 1.0% by weight or more. In addition, this Mg content is preferably 5.0% by weight or less and more preferably 3.0% by weight or less. Mg content is particularly preferably within the range of 1.0% to 3.0% by weight.

The Al content in the plating layer is preferably within the range of 25% to 75% by weight. If the Al content is 25% by weight or more, the Zn content in the plating layer does not become excessive, and corrosion is adequately ensured on the surface of the plating layer. If the Al content is 75% by weight or less, sacrificial corrosion preventive effects of Zn are adequately demonstrated, hardening of the plating layer is inhibited, and bending workability of the hot-dipped steel is increased. Moreover, the Al content is also preferably 75% by weight or less from the viewpoint of further inhibiting wrinkling of the plating layer by preventing fluidity of the hot-dip plating metal from becoming excessively low during production of the hot-dipped steel. This Al content is particularly preferably 45% by weight or more. In addition, this Al content is particularly preferably 65% by weight or less. The Al content is particularly preferably within the range of 45% by weight to 65% by weight.

The Si content of the plating layer is preferably within the range of 0.5% to 10% by weight based on the Al content. If the content of Si is 0.5% by weight or more based on the Al content, excessively alloying between the Al in the plating layer and the steel substrate is adequately inhibited. If the Si content exceeds 10% by weight based on the Al content, not only does the action of the Si become saturated, but dross easily forms in a hot-dip plating bath 2 during production of the hot-dipped steel. This Si content is particularly preferably 1.0% by weight or more. In addition, this Si content is particularly preferably 5.0% by weight or less. The Si content is particularly preferably within the range of 1.0% to 5.0% by weight.

Moreover, the weight ratio of Si to Mg in the plating layer is preferably between 100:50 and 100:300. In this case, the formation of a Si—Mg layer in the plating layer in particular is promoted and the formation of wrinkles in the plating layer is further inhibited. This weight ratio of Si to Mg is more preferably 100:70 to 100:250 and even more preferably 100:100 to 100:200.

The plating layer preferably further contains Cr as a constituent element thereof. In this case, growth of the Si—Mg phase in the plating layer is promoted by Cr, the volume percentage of the Si—Mg phase in the plating layer increases, and the ratio of the Mg in the Si—Mg phase to the total weight of Mg in the plating layer increases. As a result, wrinkling of the plating layer is further inhibited. The Cr content in the plating layer is preferably within the range of 0.02% by weight to 1.0% by weight. If the Cr content in the plating layer is greater than 1.0% by weight, not only does the above-mentioned action become saturated, but dross easily forms in the hot-dip plating bath 2 during production of the hot-dipped steel. This Cr content is particularly preferably 0.05% by weight or more. In addition, this Cr content is particularly preferably 0.5% by weight or less. The Cr content is more preferably within the range of 0.07% by weight to 0.2% by weight.

In the case the plating layer contains Cr, the Cr content in the outermost layer having a depth of 50 nm in the plating layer is preferably 100 ppm to 500 ppm by weight. In this case, the corrosion resistance of the plating layer improves further. This is thought to be because, when Cr is present in the outermost layer, a passive film is formed on the plating layer, and anodic dissolution of the plating layer is inhibited as a result thereof. This Cr content is more preferably 150 ppm to 450 ppm by weight and even more preferably 200 ppm to 400 ppm by weight.

An alloy layer containing Al and Cr is preferably interposed between the plating layer and the steel substrate. In the present invention, the alloy layer is considered to be a layer that differs from the plating layer. The alloy layer may also contain various metal elements such as Mn, Fe, Co, Ni, Cu, Zn or Sn other than Al and Cr as constituent elements thereof. When such an alloy layer is present, growth of the Si—Mg phase in the plating layer is promoted by the Cr in the alloy layer, the volume percentage of the Si—Mg phase in the plating layer increases, and the ratio of Mg in the Si—Mg phase to the total weight of Mg in the plating layer increases. As a result, wrinkling and running of the plating layer are further inhibited. In particular, the ratio of the content ratio of Cr in the alloy layer to the content ratio of Cr in the plating layer is preferably 2 to 50. In this case, the area ratio of the Si—Mg phase on the surface of the plating layer becomes lower as a result of growth of the Si—Mg phase being promoted near the alloy layer in the plating layer, thereby further inhibiting running and maintaining corrosion resistance of the plating layer over a longer period of time. The ratio of the content ratio of Cr in the alloy layer to the content ratio of Cr in the plating layer is more preferably 3 to 40 and even more preferably 4 to 25. The amount of Cr in the alloy layer can be derived by measuring a cross-section of the plating layer using an energy-dispersive X-ray spectrometer (EDS).

The thickness of the alloy layer is preferably within the range of 0.05 μm to 5 μm. If this thickness is 0.05 μm or more, the above-mentioned action of the alloy layer is effectively demonstrated. If this thickness is 5 μm or less, workability of the hot-dipped steel is less likely to be impaired by the alloy layer.

If the plating layer contains Cr, corrosion resistance is also improved after bending and deformation of the plating layer. The reason for this is thought to be as described below. When the plating layer is subjected to severe bending and deformation, cracks may form in the plating layer and coated film thereon. At that time, water and oxygen end up entering the plating layer through these cracks, thereby directly exposing alloy within the plating layer to corrosive factors. However, Cr present particularly in the surface layer of the plating layer and Cr present in the alloy layer inhibit corrosive reactions of the plating layer, thereby inhibiting expansion of corrosion initiating from the cracks. In order to improve corrosion resistance following bending and deformation of the plating layer in particular, the Cr content in the outermost layer having a depth of 50 nm in the plating layer is preferably 300 ppm by weight or more, and particularly preferably within the range of 200 ppm to 900 ppm by weight. In addition, in order to improve corrosion resistance following bending and deformation of the plating layer in particular, the ratio of the content ratio of Cr in the alloy layer to the content ratio of Cr in the plating layer is preferably 20 or more and particularly preferably within the range of 20 to 30.

The plating layer preferably further contains Sr as a constituent element thereof. In this case, the formation of the Si—Mg phase in the plating layer is further promoted by Sr. Moreover, the formation of an Mg-based oxide film in the surface layer of the plating layer is inhibited by Sr. This is thought to be the result of the formation of an Mg-based oxide film being inhibited since an Sr oxide film is preferentially formed more easily than an Mg-based oxide film. As a result, the formation of wrinkles in the plating layer is further inhibited. The Sr content in the plating layer is preferably within the range of 1 ppm to 1000 ppm by weight. If this Sr content is less than 1 ppm by weight, the above-mentioned action is no longer demonstrated, while if the Sr content exceeds 1000 ppm by weight, not only does the action of Sr become saturated, but dross is easily formed in the hot-dip plating bath 2 during production of the hot-dipped steel. This Sr content is particularly preferably 5 ppm by weight or more. In addition, this Sr content is particularly preferably 500 ppm by weight or less and even more preferably 300 ppm by weight or less. The Sr content is more preferably within the range of 20 ppm to 50 ppm by weight.

The plating layer preferably further contains Fe as a constituent element thereof. In this case, formation of the Si—Mg phase in the plating layer is further promoted by Fe. Moreover, Fe also contributes to increasing the fineness of the microstructure and spangle structure of the plating layer, thereby improving the appearance and workability of the plating layer. The Fe content in the plating layer is preferably within the range of 0.1% to 0.6% by weight. If this Fe content is less than 0.1% by weight, the microstructure and spangle structure of the plating layer becomes coarse, thereby impairing the appearance of the plating layer while also resulting in poor workability. If the Fe content exceeds 0.6% by weight, the spangle structure of the plating layer becomes excessively fine or disappears, thereby eliminating any improvement of appearance attributable to the spangle structure while also facilitating the formation of dross in the hot-dip plating bath 2 during production of the hot-dipped steel, thereby further impairing the appearance of the plating layer. This Fe content is particularly preferably 0.2% by weight or more. In addition, this Fe content is particularly preferably 0.5% by weight or less. The Fe content is particularly preferably within the range of 0.2% to 0.5% by weight.

The plating layer may further contain elements selected from alkaline earth elements, Sc, Y, lanthanoid elements, Ti and B as constituent elements thereof.

Alkaline earth elements (Be, Ca, Ba and Ra), Sc, Y and lanthanoid elements (such as La, Ce, Pr, Nd, Pm, Sm and Eu) demonstrate an action similar to that of Sr. The total content of these components in the plating layer as a weight ratio is preferably 1.0% by weight or less.

When at least one of Ti and B is contained in the plating layer, spangle structure increases in fineness due to increased fineness of the α-Al phase (dendritic structure) of the plating layer, thereby enabling the spangle structure to improve the appearance of the plating layer. Moreover, the formation of wrinkles in the plating layer is further inhibited by the presence of at least one of Ti and B. This thought to be due to the action of Ti and B also increasing the fineness of the Si—Mg phase, and this increased fineness of the Mg—Si phase effectively inhibits flow of the hot-dip plating metal in the process by which the hot-dip plating metal solidifies and forms the plating layer. Moreover, the concentration of stress in the plating layer during bending is alleviated by this increased fineness of the plating structure, thereby inhibiting the formation of large cracks and further improving the bending workability of the plating layer. In order for this action to be demonstrated, the total content of Ti and B in the hot-dip plating bath 2 as a weight ratio is preferably within the range of 0.0005% to 0.1% by weight. The total content of Ti and B is particularly preferably 0.001% by weight or more. In addition, the total content of Ti and B is particularly preferably 0.05% by weight or less. The total content of Ti and B is particularly preferably within the range of 0.001% to 0.05% by weight.

Zn accounts for the remainder of all constituent elements of the plating layer after excluding constituent elements other than Zn.

The plating layer preferably does not contain elements other than the above-mentioned elements as constituent elements thereof. In particular, the plating layer preferably contains only Al, Zn, Si, Mg, Cr, Sr and Fe as constituent elements, or preferably contains only Al, Zn, Si, Mg, Cr, Sr and Fe, as well as elements selected from alkaline earth elements, Sc, Y, lanthanoid elements, Ti and B, as constituent elements thereof.

However, although it goes without saying, the plating layer may also contain unavoidable impurities such as Pb, Cd, Cu or Mn. The content of these unavoidable impurities is preferably as low as possible, and the total content of these unavoidable impurities as a weight ratio based on the weight of the plating layer is preferably 1% by weight or less.

[Method for Producing Hot-Dipped Steel]

In a preferred embodiment, a hot-dip plating bath is prepared during production of a hot-dipped steel that has a composition that coincides with the composition of constituent elements of the plating layer. Although an alloy layer is formed between the steel substrate and the plating layer as a result of hot-dip plating treatment, the resulting change in composition is small enough to be ignored.

In the present embodiment, a hot-dip plating bath is prepared that contains, for example, 25% to 75% by weight of Al, 0.5% to 10% by weight of Mg, 0.02% to 1.0% by weight of Cr, 0.5% to 10% by weight of Si based on Al, 1 ppm to 1000 ppm by weight of Sr, 0.1% to 1.0% by weight of Fe, and Zn. Zn accounts for the remainder of all constituent elements of the plating layer after excluding constituent elements other than Zn. The weight ratio of Si to Mg in the hot-dip plating bath is preferably 100:50 to 100:300.

The hot-dip plating bath may further contain a component selected from alkaline earth elements, Sc, Y, lanthanoid elements, Ti and B. These components are contained in the hot-dip plating bath 2 as necessary. The total content of alkaline earth elements (Be, Ca, Ba and Ra), Sc, Y and lanthanoid elements (such as La, Ce, Pr, Nd, Pm, Sm and Eu) in the hot-dip plating bath 2 as a weight ratio is preferably 1.0% or less. In the case the hot-dip plating bath 2 contains a component composed of at least one of Ti and B, the total content of Ti and B in the hot-dip plating bath 2 as a weight ratio is preferably within the range of 0.0005% to 0.1%.

The hot-dip plating bath preferably does not contain components other than those described above. In particular, the hot-dip plating bath preferably contains only Al, Zn, Si, Mg, Cr, Sr and Fe. The hot-dip plating bath also preferably contains only Al, Zn, Si, Mg, Cr, Sr and Fe as well as elements selected from alkaline earth elements, Sc, Y, lanthanoid elements, Ti and B.

For example, in preparing the hot-dip plating bath 2, Al at 25% to 75%, Cr at 0.02% to 1.0%, Si at 0.5% to 10% based on Al, Mg at 0.1% to 0.5%, Fe at 0.1% to 0.6% and Sr at 1 ppm to 500 ppm are preferably contained as weight ratios in the hot-dip plating bath 2, or elements selected from alkaline earth elements, lanthanoid elements, Ti and B are preferably further contained, and the remainder is preferably Zn.

However, although it goes without saying, the hot-dip plating bath may also contain unavoidable impurities such as Pb, Cd, Cu or Mn. The content of these unavoidable impurities is preferably as low as possible, and the total content of these unavoidable impurities is preferably 1% by weight or less as a weight ratio based on the weight of the hot-dip plating bath.

When hot-dip plating treatment is carried out on the steel substrate 1 using the hot-dip plating bath 2 having the composition described above, in addition to corrosion resistance of the surface of the plating layer in particular being improved by Al, due to sacrificial corrosion protective action by Zn, edge creep in particular is inhibited on cut ends of the hot-dipped steel, thereby imparting a high level of corrosion resistance to the hot-dipped steel.

Moreover, as a result of the plating layer containing Mg, which is a less noble metal than Zn, the sacrificial corrosion preventive action of the plating layer is further enhanced, thereby further improving the corrosion resistance of the hot-dipped steel.

Moreover, the plating layer formed by hot-dip plating treatment is resistant to the formation of wrinkles. In the past, when a molten metal (hot-dip plating metal) containing Mg was adhered to the steel substrate 1 by hot-dip plating treatment, Mg easily concentrated on the surface of the hot-dip plating metal, thereby resulting in the formation of an Mg-based oxide film, and wrinkles easily formed in the plating layer due to this Mg-based oxide film. However, when the plating layer is formed by using the hot-dip plating bath 2 having the above-mentioned composition, concentration of Mg in the surface layer of the hot-dip plating metal adhered to the steel substrate 1 is inhibited, thereby making it difficult for wrinkles to form on the surface of the plating layer even if the hot-dip plating metal flows. Moreover, since fluidity inside the hot-dip plating metal is reduced, flow per se of the hot-dip plating metal is inhibited, and it becomes even more difficult for wrinkles to form.

Inhibition of concentration of Mg and flow of the hot-dip plating metal as described above are thought to be attributable to the mechanism described below.

As the hot-dip plating metal adhered to the surface of the steel substrate 1 is cooled and solidifies, an α-Al phase first precipitates as primary crystals which then grow into a dendritic structure. As solidification of this Al-rich α-Al phase progresses in this manner, the concentrations of Mg and Si in the remaining hot-dip plating metal (namely, those components of the hot-dip plating metal that have not yet solidified) gradually increase. Next, when the steel substrate 1 is cooled and its temperature decreases further, an Si-containing phase containing Si (Si—Mg phase) solidifies and precipitates from within the remaining hot-dip plating metal. This Si—Mg phase is a phase composed of an alloy of Mg and Si as previously described. Precipitation and growth of this Si—Mg phase is promoted by Cr, Fe and Sr. As a result of Mg in the hot-dip plating metal being incorporated into this Si—Mg phase, migration of Mg to the surface layer of the hot-dip plating metal is suppressed, and concentration of Mg in the surface layer of the hot-dip plating metal is inhibited.

Moreover, Sr present in the hot-dip plating metal also contributes to inhibiting concentration of Mg. This is thought to be the result of Sr in the hot-dip plating metal being an element that is easily concentrated in the same manner as Mg, thereby resulting in the Sr competing to form an oxide film on the plating surface with Mg, and as a result, inhibiting formation of an Mg-based oxide film.

Moreover, as a result of the Si—Mg phase solidifying and growing in the remaining hot-dip plating metal other than the α-Al phase in the form of primary crystals as previously described, the hot-dip plating metal enters the state of solid-liquid mixed phase, thereby causing a decrease in fluidity of the hot-dip plating metal per se, and as a result thereof, formation of wrinkles on the surface of the plating layer is inhibited.

Fe is important in terms of controlling the microstructure and spangle structure of the plating layer. Although the reason for Fe having an effect on the structure of the plating layer is presently unclear, it is thought to be because Fe alloys with Si in the hot-dip plating metal, and this alloy serves as a solidification nucleus during solidification of the hot-dip plating metal.

Moreover, since Sr is a less noble element in the same manner as Mg, the sacrificial corrosion preventive action of the plating layer is further enhanced by Sr, and corrosion resistance of the hot-dipped steel is further improved. Sr also demonstrates the action of inhibiting acicularization of the precipitated states of the Si phase and Si—Mg phase, thereby causing the Si phase and Si—Mg phase to become spherical and inhibiting the formation of cracks in the plating layer.

An alloy layer containing Al in a portion thereof is formed in the hot-dip plating metal between the plating layer and the steel substrate 1 during hot-dip plating treatment. For example, in the case pre-plating to be subsequently described is not carried out on the steel substrate 1, an Fe—Al-based alloy layer is formed consisting mainly of Al in the plating bath and Fe in the steel substrate 1. In the case the pre-plating to be subsequently described is carried out on the steel substrate 1, an alloy layer is formed that contains Al of the plating bath and all or a portion of the constituent elements of pre-plating, or further contains Fe in the steel substrate 1.

In the case the plating bath contains Cr, the alloy layer further contains Cr in addition to Al. The alloy layer can contain various metal elements such as Si, Mn, Fe, Co, Ni, Cu, Zn or Sn in addition to Al and Cr as constituent elements thereof corresponding to such factors as the composition of the plating bath, the presence or absence of pre-plating, or the composition of the steel substrate 1.

A portion of the Cr in the hot-dip plating metal is contained in the alloy layer at a higher concentration than in the plating layer. When such an alloy layer is formed, growth of the Si—Mg phase in the plating layer is promoted by Cr in the alloy layer, which in addition to increasing the volume percentage of the Si—Mg phase in the plating layer, increases the ratio of Mg in the Si—Mg phase to the total weight of Mg in the plating layer. As a result, wrinkling of the plating layer is further inhibited. Moreover, as a result of formation of the alloy layer, corrosion resistance of the hot-dipped steel is further improved. Namely, as a result of growth of the Si—Mg phase being promoted near the alloy layer within the plating layer, the area ratio of the Si—Mg phase on the surface of the plating layer decreases, and as a result, running in the plating layer is inhibited and corrosion resistance of the plating layer is maintained over a long period of time. In particular, the ratio of the content ratio of Cr in the alloy layer to the content ratio of Cr in the plating layer is preferably 2 to 50. This ratio of the content ratio of Cr in the alloy layer to the content ratio of Cr in the plating layer is more preferably 3 to 90 and even more preferably 4 to 25. The amount of Cr in the alloy layer can be derived by measuring a cross-section of the plating layer using an energy-dispersive X-ray spectrometer (EDS).

Although workability of the hot-dipped steel decreases if the alloy layer is excessively thick, excessive growth of the alloy layer is inhibited by the action of Si in the hot-dip plating bath 2, and consequently, favorable workability of the hot-dipped steel is ensured. The thickness of the alloy layer is preferably within the range of 0.05 μm to 5 μm. If the thickness of the alloy layer is within this range, corrosion resistance of the hot-dipped steel is adequately improved and workability is also adequately improved.

Moreover, corrosion resistance of the plating layer is further improved accompanying the concentration of Cr near the surface thereof being maintained within a fixed range in the plating layer. Although the reason for this is unclear, it is presumed that this is the result of the formation of a complex oxide film near the surface of the plating layer due to Cr bonding with oxygen. In order to improve corrosion resistance of the plating layer in this manner, the content of Cr in the outermost layer having a depth of 50 nm in the plating layer is preferably 100 ppm by weight to 500 ppm by weight.

If the hot-dip plating bath contains Cr, corrosion resistance is also improved after bending and deformation of the plating layer. The reason for this is thought to be as described below. When the plating layer is subjected to severe bending and deformation, cracks may form in the plating layer and coated film thereon. At that time, water and oxygen end up entering the plating layer through these cracks, thereby directly exposing alloy within the plating layer to corrosive factors. However, Cr present particularly in the surface layer of the plating layer and Cr present in the alloy layer inhibit corrosive reactions of the plating layer, thereby inhibiting expansion of corrosion initiating from the cracks.

The hot-dip plating metal treated in the preferred embodiment described above is multi-component molten metal containing seven or more component elements, and although the solidification process thereof is extremely complex and difficult to predict theoretically, the inventors of the present invention obtained the above-mentioned findings through experimental observations and the like.

As a result of the composition of the hot-dip plating bath 2 being adjusted in the manner described above, wrinkling and running in the plating layer can be inhibited as previously described, and corrosion resistance and workability of hot-dipped steels can be ensured.

If the content of Al in this hot-dip plating bath 2 is less than 25%, the content of Zn in the plating layer becomes excessive and corrosion resistance on the surface of the plating layer becomes inadequate, while if the Al content exceeds 75%, sacrificial corrosion preventive effects of Zn decrease, the plating layer becomes hard, and bending workability of the hot-dipped sheet steel ends up decreasing. If the Al content exceeds 75%, fluidity of the hot-dip plating metal ends up increasing, resulting in the risk of triggering the formation of wrinkles in the plating layer. The Al content is particularly preferably 45% or more. In addition, the Al content is particularly preferably 65% or less. The Al content is particularly preferably within the range of 45% to 65%.

If the Cr content in the hot-dip plating bath 2 is less than 0.02%, in addition to it being difficult to adequately ensure corrosion resistance of the plating layer, it also becomes difficult to adequately inhibit wrinkling and running of the plating layer, while if the content of Cr exceeds 1.0%, not only does the action of improving corrosion resistance of the plating layer become saturated, but dross easily forms in the hot-dip plating bath 2. This Cr content is particularly preferably 0.05% or more. In addition, this Cr content is particularly preferably 0.5% or less. The Cr content is more preferably within the range of 0.07% to 0.2%.

The above-mentioned action is no longer demonstrated if the content of Si in the hot-dip plating bath 2 based on Al is less than 0.5%, and if the content exceeds 10%, not only does the action of Si become saturated, but dross easily forms in the hot-dip plating bath 2. This Si content is particularly preferably 1.0% or more. In addition, this Si content is particularly preferably 5.0% or less. The Si content is more preferably within the range of 1.0% to 5.0%.

If the content of Mg in the hot-dip plating bath 2 is less than 0.1%, corrosion resistance of the plating layer is not adequately ensured, while if the content exceeds 10%, not only does the action of improving corrosion resistance become saturated, but dross easily formed in the hot-dip plating bath 2. This Mg content is more preferably 0.5% or more and even more preferably 1.0% or more. In addition, this Mg content is particularly preferably 5.0% or less and more preferably 3.0% or less. The Mg content is particularly preferably within the range of 1.0% to 3.0%.

If the content of Fe in the hot-dip plating bath 2 is less than 0.1%, the microstructure and spangle structure of the plating layer becomes coarse, which together with impairing the appearance of the plating layer, while also resulting in the risk of poor workability, while if the content of Fe exceeds 0.6%, the spangle structure of the plating layer becomes excessively fine or disappears, thereby eliminating any improvement of appearance attributable to the spangle structure while also facilitating the formation of dross in the hot-dip plating bath 2. This Fe content is particularly preferably 0.2% or more. This Fe content is particularly preferably 0.5% or less. The Fe content is particularly preferably within the range of 0.2% to 0.5%.

If the content of Sr in the hot-dip plating bath 2 is less than 1 ppm, the above-mentioned action is no longer demonstrated, while if the content exceeds 500 ppm, not only does the action of Sr become saturated, but dross easily forms in the hot-dip plating bath 2. The Sr content is particularly preferably 5 ppm or more. The Sr content is particularly preferably 300 ppm or less. The Sr content is more preferably within the range of 20 ppm to 50 ppm.

In the case the hot-dip plating bath 2 contains a component selected from alkaline earth elements and lanthanoid elements, the alkaline earth elements (Be, Ca, Ba and Ra), Sc, Y and lanthanoid elements (such as La, Ce, Pr, Nd, Pm, Sm or Eu) demonstrate the same action as Sr. The total content of these components in the hot-dip plating bath 2 as a weight ratio is preferably 1.0% or less as previously described.

In the case the hot-dip plating bath 2 contains Ca in particular, the formation of dross in the hot-dip plating bath is inhibited considerably. In the case the hot-dip plating bath contains Mg, although it is difficult to avoid a certain degree of the formation of dross even if the Mg content is 10% by weight or less, and it is necessary to remove the dross from the plating bath in order to ensure a favorable appearance of hot-dipped steels, if Ca is further contained in the hot-dip plating bath, dross formation attributable to Mg is inhibited considerably. As a result, in addition to further inhibiting impairment of the appearance of the hot-dipped steel by dross, the bother associated with having to remove dross from the hot-dip plating bath is reduced. The content of Ca in the hot-dip plating bath 2 is preferably within the range of 100 ppm to 5000 ppm by weight. If the content is 100 ppm by weight or more, formation of dross in the hot-dip plating bath is effectively inhibited. If the Ca content is in excess, although there is the risk of the Ca causing the formation of dross, by making the Ca content to be 500 ppm by weight or less, dross formation attributable to Ca is inhibited. The Ca content is more preferably within the range of 200 ppm to 1000 ppm by weight.

If at least one of Ti and B is contained in the hot-dip plating bath 2, the spangle structure of the plating layer increases in fineness due to increased fineness of the α-Al phase (dendritic structure) of the plating layer, thereby enabling the spangle structure to improve the appearance of the plating layer. Moreover, the formation of wrinkles in the plating layer is further inhibited. This thought to be due to the action of Ti and B also increasing the fineness of the Si—Mg phase, and this increased fineness of the Si—Mg phase effectively inhibits flow of the hot-dip plating metal in the process by which the hot-dip plating metal solidifies and forms the plating layer. Moreover, the concentration of stress in the plating layer during bending is alleviated by this increased fineness of the plating structure, thereby inhibiting the formation of large cracks and further improving the bending workability. In order for this action to be demonstrated, the total content of Ti and B in the hot-dip plating bath 2 as a weight ratio is preferably within the range of 0.0005% to 0.1%. The total content of Ti and B is particularly preferably 0.001% or more. The total content of Ti and B is particularly preferably 0.05% or less. The total content of Ti and B is particularly preferably within the range of 0.001% to 0.05%.

The plating layer is formed by hot-dip plating treatment using this hot-dip plating bath 2. In this plating layer, concentration of Mg in the surface layer is inhibited as previously described. As a result, Mg content in any region having a size of 4 mm in diameter and a depth of 50 nm in the outermost layer of the plating layer having a depth of 50 nm is preferably less than 60% by weight. In this case, the amount of Mg-based oxide film on the outermost layer of the plating layer becomes particularly low, and wrinkling caused by the Mg-based oxide film is further inhibited. Wrinkling caused by the Mg-based oxide film is more greatly inhibited the lower the Mg content in the outermost layer. This Mg content is more preferably less than 40% by weight, even more preferably less than 20% by weight, and particularly preferably less than 10% by weight. There are preferably no portions in the outermost layer of the plating layer having a thickness of 50 nm where the Mg content is 60% by weight or more, more preferably no portions where the Mg content is 40% by weight or more, and even more preferably no portions where the Mg content is 20% by weight or more.

The following provides an explanation of the physical significance of the Mg content. The content of Mg in an MgO oxide having a stoichiometric composition is about 60% by weight. Namely, an Mg content of less than 60% by weight means that MgO having a stoichiometric composition (oxide film consisting of MgO only) is not present in the outermost layer of the plating layer, or the formation of this MgO having a stoichiometric composition is extremely inhibited. In the present embodiment, as a result of inhibiting excessive oxidation of Mg in the outermost layer of the plating layer, the formation of an oxide film composed of MgO alone is inhibited. Complex oxides containing small or large amounts of oxides of elements other than Mg such as Al, Zn or Sr are formed in the outermost layer of the plating layer, and consequently, the content of Mg in the surface layer of the plating layer is thought to decrease relative thereto.

The Mg content in the outermost layer of the plating layer can be analyzed using a glow discharge optical emission spectrometer. In the case it is difficult to obtain accurate values for quantitative analysis of concentration, the absence of an oxide film of MgO alone in the outermost layer of the plating layer may be confirmed by comparing concentration curves of each of the plurality of elements contained in the plating layer.

The volume percentage of the Si—Mg phase in the plating layer is preferably within the range of 0.2% to 15% by volume. The volume percentage of this Si—Mg phase is more preferably 0.2% to 10%, even more preferably 0.3% to 8% and particularly preferably 0.4% to 5%. The presence of the Si—Mg phase in the plating layer in this manner enables Mg to be adequately incorporated in the Si—Mg phase during formation of the plating layer while also causing the flow of the hot-dip plating metal to be inhibited by the Si—Mg phase, thereby further inhibiting the formation of wrinkles in the plating layer.

In the hot-dipped steel, protrusions having height of greater than 200 μm and steepness greater than 1.0 are preferably no longer present on the surface of the plating layer in particular as a result of wrinkling of the surface of the plating layer being inhibited in the manner described above. Steepness refers to a value defined by the expression (protrusion height (μm))/(protrusion bottom width (μm)). The bottom of a protrusion refers to the location where the protrusion intersects a virtual plane containing a flat surface surrounding the protrusion. The height of a protrusion refers to the height from the bottom of the protrusion to the tip of the protrusion. In the case of low steepness, the appearance of the plating surface is further improved. Moreover, in the case a chemical conversion treatment layer or coating layer is formed on the plating layer as will be subsequently described, in addition to the protrusions being prevented from penetrating through the chemical conversion treatment layer or coating layer, the thickness of the chemical conversion treatment layer or coating layer is able to easily be made uniform. As a result, in addition to improving the appearance of the hot-dipped steel on which a chemical conversion treatment layer or coating layer is formed, the hot-dipped steel is able to demonstrate even more superior corrosion resistance and the like due to the chemical conversion treatment layer or coating layer.

Adjustment of the degree of concentration of Mg, status of the Si—Mg phase, thickness of the alloy layer and steepness of protrusions on the surface of the plating layer can be achieved by carrying out hot-dip plating treatment on the steel substrate 1 using the hot-dip plating bath 2 having the above-mentioned composition.

In carrying out hot-dip plating treatment, hot-dip plating treatment for forming a plating layer may be carried out on the steel substrate 1 on which is formed a pre-plating layer containing at least one component selected from Cr, Mn, Fe, Co, Ni, Cu, Zn and Sn. The pre-plating layer is formed on the surface of the steel substrate 1 by carrying out pre-plating treatment on the steel substrate 1 before carrying out the hot-dip plating treatment. Due to the presence of this pre-plating layer, wettability between the steel substrate 1 and hot-dip plating metal during hot-dip plating treatment increases, and adhesion between the steel substrate 1 and the plating layer improves.

Although dependent on the type of metal that composes the pre-plating layer, the pre-plating layer contributes to further improvement of surface appearance and corrosion resistance of the plating layer. For example, in the case a pre-plating layer is formed that contains Cr, the formation of an alloy layer containing Cr is promoted between the steel substrate 1 and the plating layer, thereby further improving corrosion resistance of the hot-dipped steel. For example, in the case a pre-plating layer is formed that contains Fe and Ni, wettability between the steel substrate 1 and the hot-dip plating metal increases, adhesion of the plating layer improves considerably, precipitation of the Si—Mg phase is further promoted, and the appearance of the surface of the plating layer is further improved. Promotion of precipitation of the Si—Mg phase is also thought to occur due to a reaction between the pre-plating layer and the hot-dip plating metal.

Although there are no particular limitations on the adhered amount of the pre-plating layer, the amount adhered to one side of the steel substrate 1 is preferably within the range of 0.1 $g/m^2$ to 3 $g/m^2$. If the adhered amount is less than 0.1 $g/m^2$, it becomes difficult to cover the surface of the steel substrate with the pre-plating layer, and ameliorative effects are not adequately demonstrated by the pre-plating layer. In addition, in the case the adhered amount exceeds 3 $g/m^2$, ameliorative effects become saturated and production cost increases.

The following provides an overview of a hot-dip plating, equipment for carrying out hot-dip plating treatment on the steel substrate 1 and an explanation of optimum treatment conditions for hot-dip plating treatment.

The steel substrate 1 targeted for treatment is a member formed from steel such as alloy steel, stainless steel, nickel chrome steel, nickel chrome molybdenum steel, chrome steel, chrome molybdenum steel or manganese steel. Examples of the steel substrate 1 include various members such as thin sheet steel, thick sheet steel, die steel, steep pipe or steel wire. In other words, there are no particular limitations on the form of the steel substrate 1.

Flux treatment may be carried out on the steel substrate 1 prior to hot-dip plating treatment. This flux treatment makes it possible to improve wettability and adhesion between the steel substrate 1 and the hot-dip plating bath 2. The steel substrate 1 may also be subjected to thermal annealing and reduction treatment prior to being immersed in the hot-dip plating bath 2 or this treatment may be omitted. Pre-plating treatment may also be carried out on the steel substrate 1 prior to hot-dip plating treatment as previously described.

The following provides an explanation of the production process of the hot-dipped steel (hot-dipped sheet steel) in the case of employing a sheet substrate (sheet steel 1*a*) for the steel substrate 1, namely in the case of producing a hot-dipped sheet steel.

The hot-dip plating equipment shown in FIG. 1 is provided with a transport device that continuously transports the sheet steel 1*a*. This transport device is composed of a feeder 3, a winder 12 and a plurality of transport rollers 15. In this transport device, a coil 13 of a long sheet steel 1*a* (a first coil 13) is held by the feeder 3. This first coil 13 is unwound with the feeder 3, and the sheet steel 1*a* is transported to the winder 12 while being supported by the transport rollers 15. Moreover, the sheet steel 1*a* is wound by the winder 12 and this winder 12 holds a coil 14 (a second coil 14) of the sheet steel 1*a*.

In this hot-dip plating equipment, a heating furnace 4, an annealing/cooling unit 5, a snout 6, a pot 7, spray nozzles 9, a cooling device 10 and a temper rolling/shape correcting device 11 are sequentially provided moving in order from the upstream side of the transport route of the sheet steel 1*a* used by the transport device. The heating furnace 4 heats the sheet steel 1*a*. This heating furnace 4 is composed of an oxidation-free furnace or the like. The annealing/cooling unit 5 thermally anneals the sheet steel 1*a* followed by cooling thereof. This annealing/cooling unit 5 is connected to the heating furnace 4, and an annealing furnace is provided on the upstream side while a cooling zone (cooler) is provided on the upstream side. A reducing atmosphere is maintained within the annealing/cooling unit 5. The snout 6 is a tubular member through which the sheet steel 1*a* is transported, with one end thereof being connected to the annealing/cooling unit 5, and the other end located in the hot-dip plating bath 2 within the pot 7. A reducing atmosphere is maintained within the snout 6 in the same manner as within the annealing/cooling unit 5. The pot 7 is a container for retaining the hot-dip plating bath 2, and a sync roll 8 is arranged therein. The spray nozzles 9 spray a gas towards the sheet steel 1*a*. The spray nozzles 9 are arranged above the pot 7. These spray nozzles 9 are arranged at locations that allow them to spray a gas towards both sides of the sheet steel 1*a* that has been lifted up from the pot 7. The cooling device 10 cools hot-dip plating metal adhered to the sheet steel. Examples of the cooling device 10 include an air cooler and mist cooler, and the sheet steel 1*a* is cooled with this cooling device 10. The temper rolling/shape correcting device 11 carries out temper rolling and shape correction on the sheet steel 1*a* on which a plating layer has been formed. The temper rolling/shape correcting device 11 is provided with a skin pass mill or the like for carrying out temper rolling on the sheet steel 1*a*, and a tension leveler or the like for carrying out shape correction on the sheet steel 1*a* after temper rolling.

In the case of hot-dip plating treatment using this hot-dip plating equipment, the sheet steel 1*a* is continuously fed by first unwinding from the feeder 3. After this sheet steel 1*a* has been heated in the heating furnace 4, it is transported to the annealing/cooling unit 5 having a reducing atmosphere, and simultaneous to being annealed in an annealing furnace, the surface of the sheet steel 1*a* is cleaned by removing rolling oil adhered to the surface thereof and removing any oxide films by reduction, followed by being cooled in the cooling zone. Next, the sheet steel 1*a* passes through the snout 6 and then enters the pot 7 where it is immersed in the hot-dip plating bath 2. As a result of being supported by the sync roll 8 in the pot 7, the direction of transport of the sheet steel 1*a* is changed from downward to upward after which it is pulled out from the hot-dip plating bath 2. As a result, a hot-dip plating metal adheres to the sheet steel 1*a*.

Next, the amount of hot-dip plating metal adhered to the sheet steel 1*a* is adjusted by spraying gas onto both sides of the sheet steel 1*a* from the spray nozzles 9. This method of adjusting the adhered amount of hot-dip plating metal by spraying a gas is referred to as gas wiping. The adhered amount of hot-dip plating metal is preferably adjusted to within the range of 40 $g/m^2$ to 200 $g/m^2$ for both sides of the sheet steel 1*a* combined.

Examples of types of gases (wiping gas) sprayed onto the sheet steel 1*a* during gas wiping include air, nitrogen, argon, helium and steam. These wiping gases may be sprayed onto the sheet steel 1*a* after being preheated. In the present embodiment, surface oxidation and concentration of Mg in the hot-dip plating metal (increased oxidation and concentration of Mg in the surface layer of the hot-dip plating metal) are essentially inhibited by using the hot-dip plating bath 2 having a specific composition. Consequently, even if oxygen is contained in the wiping gas or oxygen is contained in the air flow incidentally generated when spraying the wiping gas, the plated amount (amount of hot-dip plating metal adhered to the sheet steel 1*a*) can be adjusted without impairing the effects of the invention.

The method used to adjust the plated amount is not limited to the gas wiping method described above, but rather various methods for controlling adhered amount can be applied. Examples of methods used to control adhered amount other than gas wiping include a roller squeezing method consisting of passing the sheet steel 1*a* between a pair of rollers arranged directly above the bath surface of the hot-dip plating bath 2, a wiping method consisting of arranging a wiping plate in close proximity to the sheet steel 1*a* pulled out of the hot-dip plating bath 2 and wiping off hot-dip plating metal with this wiping plate, an electromagnetic wiping method consisting of applying force that causes hot-dip plating metal adhered to the sheet steel 1*a* to move downward by using electromagnetic force, and an adjustment method consisting of adjusting the plated amount by allowing the hot-dip plating metal to move downward using the natural force of gravity instead of applying an external force. Two or more types of these plated amount adjustment methods may also be used in combination.

Next, the sheet steel 1*a* is transported further upward beyond the location of the spray nozzles 9, and then, it is transported so as to be turned back downward by being supported by two transport rollers 15. In other words, the sheet steel 1*a* is transported over a route in the shape of an inverted letter "U". In this inverted U-shaped route, the sheet steel 1*a* is cooled by air cooling, mist cooling or the like in the cooling device 10. As a result, hot-dip plating metal adhered to the surface of the sheet steel 1*a* is solidified resulting in the formation of a plating layer.

In order to ensure complete solidification of the hot-dip plating metal as a result of being cooled by the cooling device 10, the sheet steel 1*a* is preferably cooled by the cooling device 10 so that the surface temperature of the hot-dip plating metal (or plating layer) on the sheet steel 1*a* is 300° C. or lower. The surface temperature of the hot-dip plating metal is measured with, for example, a radiation thermometer. In order to ensure that the plating layer is formed in this manner, the cooling rate from the time the sheet steel 1*a* is pulled out of the hot-dip plating bath 2 to the time the surface of the hot-dip plating metal on the sheet steel 1*a* reaches 300° C. is preferably within the range of 5° C./sec to 100° C./sec. In order to control the cooling rate of the sheet steel 1*a*, the cooling device 10 is preferably provided with a temperature control function for adjusting the temperature of the sheet steel 1*a* along the direction of transport and the direction of sheet width. The cooling device 10 may be provided as a plurality of cooling devices along the direction of transport of the sheet steel 1*a*. In FIG. 1, primary cooling devices 101, which cool the sheet steel 1*a*, and secondary cooling devices 102, which cool the sheet steel 1*a* at a location downstream from the primary cooling devices 101, are provided in a route over which the sheet steel 1*a* is transported at a location above the locations of the spray nozzles 9. The primary cooling devices 101 and the secondary cooling devices 102 may also be provided as a plurality of cooling devices. In this case, cooling can be carried out by, for example, cooling the sheet steel 1*a* with the primary cooling devices 101 until the temperature of the hot-dip plating metal reaches a temperature of 300° C. or lower, and further cooling the sheet steel 1*a* with the secondary cooling devices 102 so that the temperature when the sheet steel 1*a* is introduced into the temper rolling/shape correcting device 11 is 100° C. or lower.

During the course of cooling the sheet steel 1*a*, the cooling rate at which the surface of the hot-dip plating metal is cooled during the time the surface temperature of the hot-dip plating metal on the sheet steel 1*a* is 500° C. or higher is preferably 50° C./sec or less. In this case, precipitation of the Si—Mg phase on the surface of the plating layer in particular is inhibited, thereby inhibiting the occurrence of running. Although the reason why a cooling rate in this temperature range has an effect on precipitation behavior of the Si—Mg phase is currently not fully understood, since the temperature gradient in the direction of thickness of the hot-dip plating metal increases if the cooling rate in this temperature range is large, and precipitation of the Mg—Si layer is preferentially promoted on the surface of the hot-dip plating metal at a lower temperature, the amount of precipitation of the Si—Mg phase on the outermost surface of the plating layer is thought to increase as a result thereof. The cooling rate in this temperature range is more preferably 40° C./sec or less and particularly preferably 35° C./sec or less.

Shape correction is carried out after temper rolling with the temper rolling/shape correcting device 11 is carried out on the cooled sheet steel 1*a*. The rolling reduction rate of temper rolling is preferably within the range of 0.3% to 3%. The elongation rate of the sheet steel 1*a* by shape correction is preferably 3% or less.

Continuing, the sheet steel 1*a* is wound up with the winder 12 and the coil 14 of the sheet steel 1*a* is held with this winder 12.

During this hot-dip plating treatment, the temperature of the hot-dip plating bath 2 in the pot 7 is preferably higher than the solidification starting temperature of the hot-dip plating bath 2 and is less than or equal to a temperature which is 40° C. higher than the solidification starting temperature. The temperature of the hot-dip plating bath 2 in the pot 7 is more preferably higher than the solidification starting temperature of the hot-dip plating bath 2 and is less than or equal to a temperature which is 25° C. higher than the solidification starting temperature. If the upper limit of the temperature of the hot-dip plating bath 2 is limited in this manner, the amount of time required from the time the sheet steel 1*a* is pulled out from the hot-dip plating bath 2 to the time the hot-dip plating metal adhered to the sheet steel 1*a* solidifies is shortened. As a result, the time during which the hot-dip plating metal adhered to the sheet steel 1*a* is in a flowable state is also shortened, thereby making it more difficult for wrinkles to form in the plating layer. If the temperature of the hot-dip plating bath 2 is less than or equal to a temperature which is 20° C. higher than the solidification starting temperature of the hot-dip plating bath 2 in particular, the formation of wrinkles in the plating layer is greatly inhibited.

Figure 2:
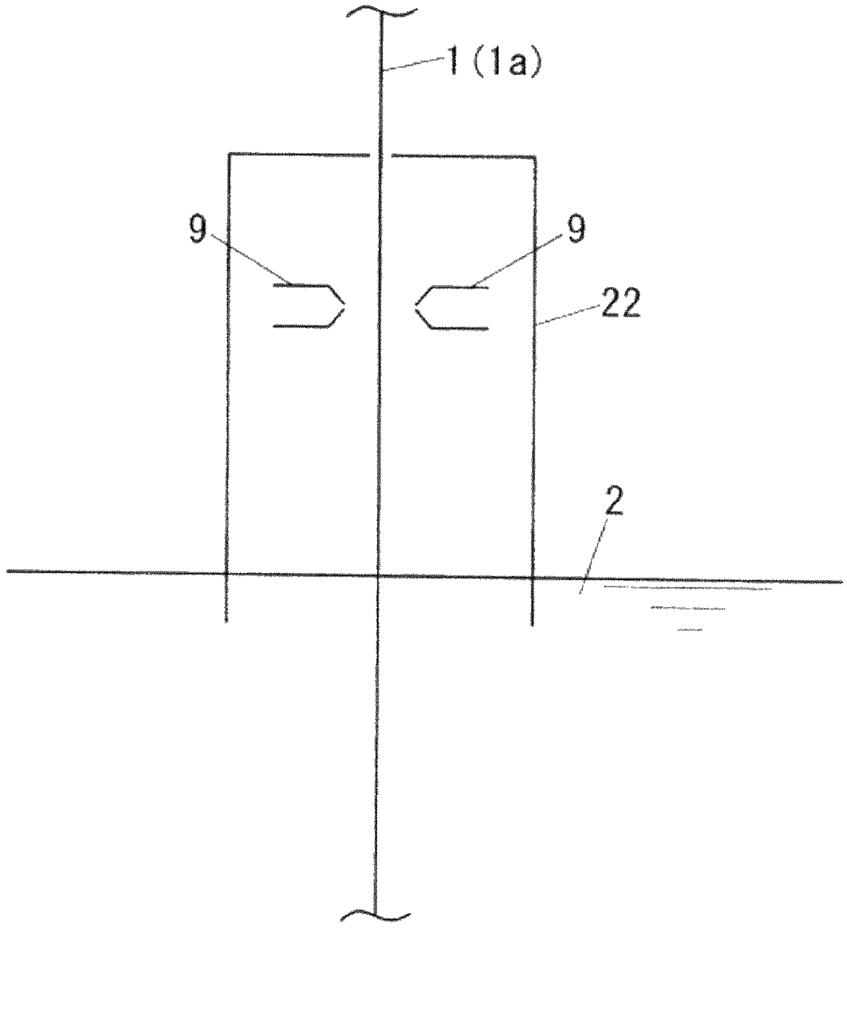
FIG. 2 is a partial schematic diagram showing another example of a hot-dip plating equipment.

When the sheet steel 1*a* is pulled out from the hot-dip plating bath 2, it may be pulled out into a non-oxidative atmosphere or low oxidative atmosphere, and adjustment of the adhered amount of hot-dip plating metal on the sheet steel 1*a* by gas wiping may also be carried out in a non-oxidative atmosphere or low oxidative atmosphere. In order to accomplish this, as shown in FIG. 2, for example, the transport route upstream from the hot-dip plating bath 2 of the sheet steel 1 pulled out from the hot-dip plating bath 2 (transport route moving upward from the hot-dip plating bath 2) is preferably surrounded by a hollow member 22, and the inside of the hollow member 22 is preferably filled with a non-oxidative gas or low oxidative gas such as nitrogen gas. A non-oxidative gas or low oxidative gas refers to gas having a lower oxygen concentration than air. The oxygen concentration of the non-oxidative or low oxidative gas is preferably 1000 ppm or less. The atmosphere in which the non-oxidative or low oxidative gas is filled is a non-oxidative or low oxidative atmosphere, and oxidation reactions are inhibited in this atmosphere. The spray nozzles 9 are arranged inside this hollow member 22. The hollow member 22 is provided so as to surround the transport route of the sheet steel 1 as it moves above the hot-dip plating bath 2 from within the hot-dip plating bath 2 (upper portion of the hot-dip plating bath 2). Moreover, gas sprayed from the spray nozzles 9 is also preferably a non-oxidative or low oxidative gas such as nitrogen gas. In this case, since the sheet steel 1*a* pulled out from the hot-dip plating bath 2 is exposed to a non-oxidative or low oxidative atmosphere, oxidation of the hot-dip plating metal adhered to the sheet steel 1*a* is inhibited, making it more difficult for an Mg-based oxide film to form on the surface layer of this hot-dip plating metal. Consequently, the formation of wrinkles in the plating layer is further inhibited. Instead of using the hollow member 22, a portion or all of the hot-dip plating equipment that contains the transport route of the sheet steel 1*a* may be arranged in a non-oxidative or low oxidative atmosphere.

Overaging treatment may also be further carried out on the sheet steel 1*a* following hot-dip plating treatment. In this case, workability of the hot-dipped steel is further improved. Overaging treatment is carried out by holding the sheet steel 1*a* within a fixed temperature range for a fixed period of time.

Figure 3A:
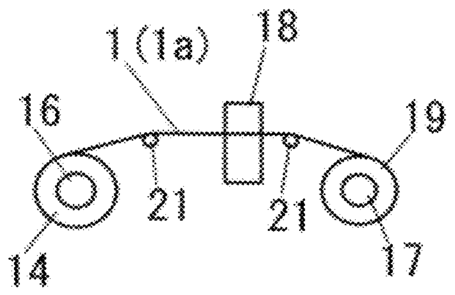
FIG. 3 is a schematic diagram showing an example of a heating apparatus and an insulating container used for overaging treatment in an embodiment of the present invention.
Figure 3B:
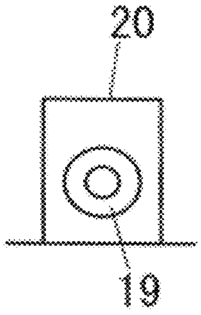

FIG. 3 shows a device used for overaging treatment, with FIG. 3(*a*) showing a heating apparatus and FIG. 3(*b*) showing an insulating container 20. The heating apparatus is provided with a transport device by which the sheet steel 1*a* is continuously transported following hot-dip plating treatment. This transport device is composed of a feeder 16, a winder 17 and a plurality of transport rollers 21 in the same manner as the transport device in the hot-dip plating equipment. A heating furnace 18, such as an induction heating furnace, is provided in the transport route of the sheet steel 1*a* transported by this transport device. There are no particular limitations on the insulating container 20 provided it is able to hold a coil 19 of the sheet steel 1*a* inside and has heat insulating properties. The insulating container 20 may also be a large container (insulating chamber).

In the case of carrying out overaging treatment on the sheet steel 1*a*, the coil 14 of the hot-dipped sheet steel 1*a* is first carried from the winder 12 of the hot-dip plating equipment with a crane or cart and then held by the feeder 16 of the heating apparatus. In the heating apparatus, the sheet steel 1*a* is continuously fed by first being unwound from the feeder 16. After the sheet steel 1*a* is heated to a temperature suitable for overaging treatment with the heating furnace 18, it is wound up with the winder 17, and the coil 19 of the sheet steel 1*a* is held by this winder 17.

Continuing, the coil 19 of the sheet steel 1*a* is carried from the winder 17 with a crane or cart and held within the insulating container 20. Overaging treatment is then carried out on the sheet steel 1*a* by holding the coil 19 of the sheet steel 1*a* in this insulating container 20 for a fixed period of time.

According to the present embodiment, since the plating layer formed on the surface of the sheet steel 1*a* contains Mg and only a slight Mg-based oxide film is present on the surface of the plating layer, even if plating layers are superimposed in a coil of the sheet steel 1*a* during overaging treatment, it is difficult for seizure or deposition to occur between the plating layers. Consequently, even if the duration of overaging treatment when the sheet steel 1*a* is held at a fixed temperature is long, or even if the temperature at which the sheet steel 1*a* is held is high, it is difficult for seizure to occur and adequate overaging treatment can be carried out on the sheet steel 1*a*. As a result, workability of the hot-dipped sheet steel increases considerably and the efficiency of overaging treatment improves.

In carrying out overaging treatment, the temperature of the sheet steel 1*a* after heating with the heating apparatus in particular is preferably within the range of 180° C. to 220° C., or in other words, the sheet steel is preferably moved from outside the insulating container to inside the insulating container in a state in which the temperature of the sheet steel 1*a* is within the above-mentioned range. A holding time y (hr) of the sheet steel 1*a* within the insulating container preferably satisfies the following formula (1).

$$5.0\times10^{22}\times t^{-10.0}\leq y\leq 7.0\times10^{24}\times t^{-10.0} \quad (1)$$

(where 150≤t≤250)

In formula (1), t (° C.) represents the temperature (holding temperature) of the sheet steel 1*a* during the holding time y (hr), and when there are temperature fluctuations in the sheet steel 1*a*, the t (° C.) is the lowest temperature among those temperature fluctuations.

Furthermore, although the hot-dip plating equipment and the heating apparatus are separate devices in the present embodiment, the hot-dip plating equipment may also serve as a heating apparatus by providing the hot-dip plating equipment with the heating furnace 18. The designs of these devices may be suitably modified by adding, omitting or substituting various elements as necessary. Although the hot-dip plating equipment and heating apparatus according to the present embodiment are suitable for the case in which the steel substrate 1 is the sheet steel 1*a*, the configurations of the hot-dip plating equipment, heating apparatus and the like can be suitably modified in design in various ways corresponding to the form and the like of the steel substrate 1. In the case plating pre-treatment is carried out on the steel substrate 1, this plating pre-treatment can also be modified in various ways corresponding to the type, form and the like of the steel substrate 1.

A chemical conversion treatment layer may also be formed by superimposing on the plating layer on the steel substrate 1 that has undergone hot-dip plating treatment or overaging treatment in this manner. A coating layer consisting of a coating material or film or the like may be formed on the plating layer either on a chemical conversion treatment layer or without having a chemical conversion treatment layer interposed there between.

The chemical conversion treatment layer is a layer formed by a known chemical conversion treatment. Examples of treatment agents for forming the chemical conversion treatment layer (chemical conversion treatment agents) include treatment agents containing chromium such as chromate treatment agents, trivalent chromate treatment agents, chromate treatment agents containing resin and trivalent chromate treatment agents, phosphoric acid-based treatment agents such as zinc phosphate treatment agents or iron phosphate treatment agents, oxide treatment agents containing metal oxides such as those of cobalt, nickel, tungsten or zirconium either alone or as a complex, treatment agents containing an inhibitor component that prevents corrosion, treatment agents combining a binder component (such as an organic binder, inorganic binder or organic-inorganic composite binder) and an inhibitor component, treatment agents combining an inhibitor component and a metal oxide, treatment agents combining a binder component and a sol such as that of silica, titania or zirconia, and treatment agents further combining components of the previously listed treatment agents.

Examples of treatment agents containing chromium include treatment agents prepared by blending aqueous and water-dispersible acrylic resins, silane coupling agents having an amino group, and chromium ion sources such as ammonium chromate or ammonium dichromate. Water-dispersible acrylic resins can be obtained by copolymerizing carboxyl group-containing monomers such as acrylic acid with glycidyl group-containing monomers such as glycidyl acrylate. Chemical conversion treatment layers formed from these chemical conversion treatment agents have high levels of water resistance, corrosion resistance and alkaline resistance, and the formation of white rust and black rust on hot-dipped steels is inhibited by these chemical conversion treatment layers, resulting in improved corrosion resistance. In order to improve corrosion resistance and prevent coloring of the chemical conversion treatment layer, the content of chromium in the chemical conversion treatment layer is preferably within the range of 5 mg/$m^2$ to 50 mg/$m^2$.

Examples of oxide treatment agents containing oxides of zirconium include treatment agents prepared by blending aqueous and water-dispersible polyester-based urethane resins, water-dispersible acrylic resins, zirconium compounds such as sodium zirconium carbonate and hindered amines. Water-dispersible polyester-based urethane resins are synthesized by, for example, reacting a polyester polyol with a hydrogenated isocyanate and copolymerizing a dimethylol alkyl acid to carry out self-emulsification. This type of water-dispersible polyester-based urethane resin imparts a high level of water resistance to chemical conversion treatment layers without using an emulsifier, and leads to improvement of corrosion resistance and alkaline resistance of hot-dipped steel.

Nickel plating treatment or cobalt plating treatment or the like may also be carried out beneath the chemical conversion treatment layer or in place of chemical conversion treatment.

Surface preparation, such as cleaning with pure water or various types of organic solvents, or cleaning with an aqueous solution or various types of organic solvents arbitrarily containing acids, alkalis and various types of etching agents, may be carried out on the surface of the plating layer prior to forming a chemical conversion treatment layer or coating layer. If the surface of the plating layer is cleaned in this manner, even if a small amount of a Mg-based oxide film is present on the surface layer of the plating layer or inorganic or organic debris is adhered to the surface of the plating layer, the Mg-based oxide film or debris is removed from the plating layer, thereby making it possible to improve adhesion between the plating layer and the chemical conversion treatment layer or coating layer.

The following provides an explanation of the usefulness of surface preparation in actively removing an Mg-based oxide film from the plating layer. Mg-based oxide films have the common property of easily dissolving when contacted with acidic aqueous solutions. For example, when the surface of the hot-dipped steel is exposed to an acidic wet state in a corrosive environment, the Mg-based oxide film dissolves and separates from the surface. As a result, when a chemical conversion treatment layer or coating layer is adhered to an Mg-based oxide film on the surface layer of the plating layer, there is the possibility of adhesion between the plating layer and the chemical conversion treatment layer or coating layer decreasing greatly. Thus, actively removing the Mg-based oxide layer by surface preparation is preferably carried out as necessary.

The chemical conversion treatment layer can be formed by a known method such as roll coating, spraying, dipping, electrolysis or air knife coating using a chemical conversion treatment agent. After applying the chemical conversion treatment agent, steps such as drying and baking may be further added as necessary by leaving at normal temperatures or using a heating apparatus such as a hot air oven, electric furnace or induction heating furnace. A curing method may also be applied using an energy beam such as infrared rays, ultraviolet rays or electron beam. The temperature during drying, drying time and the like are suitably determined corresponding to the type of chemical conversion treatment agent used, the required level of productivity and the like. A chemical conversion treatment layer formed in this manner becomes a continuous or non-continuous film on the plating layer. The thickness of the chemical conversion treatment layer is suitably determined corresponding to the type of treatment, required level of performance and the like.

A coating layer formed from a coating material or film or the like can also be formed using a known method. In the case of forming the coating layer from a coating material, examples of coating materials used include polyester resin-based coating materials, epoxy resin-based coating materials, acrylic resin-based coating materials, fluorine resin-based coating materials, silicon resin-based coating materials, amino resin-based coating materials, urethane resin-based coating materials, vinyl chloride resin-based coating materials and composite coating materials obtained by combining these coating materials. A known method can be employed to coat with the coating material, examples of which include roll coating, curtain coating, spraying, dipping, electrolysis and air knife coating. The coating material is applied onto the plating layer or onto a chemical conversion treatment layer in the case of forming a chemical conversion treatment layer or the like. After applying the coating material, the coating layer is formed by drying and baking the coating material as necessary by air drying or by using a heating apparatus such as a hot air oven, electric furnace or induction heating furnace. In the case of using an energy beam-curable coating material, the curing layer may be formed by curing the coating material with an energy beam such as infrared rays, ultraviolet rays or electron beam after coating. The temperature when drying the coating material and the drying time are suitably determined corresponding to the type of coating material used, required level of productivity and the like. The coating layer may be a continuous or non-continuous film.

The thickness of the coating layer formed from a coating material is suitably determined corresponding to the type of coating material, required level of performance and the like. For example, in the case of using the hot-dipped steel as a sheet metal product (product subjected to mechanical processing after coating), an undercoating layer having a thickness of about 2 μm to 15 μm and an overcoating layer having a thickness of about 5 μm to 200 μm are preferably formed as coating layers, through the chemical conversion treatment layer. In the case of carrying out coating after mechanical processing has been carried out on the hot-dipped steel, or after further implementing the processed hot-dipped steel by using as a building material, the thickness of the coating layer is preferably thicker, such as having a thickness of several millimeters.

In the case of forming the coating layer from a film, examples of the film include vinyl chloride-based films, polyester resin-based films, acrylic resin-based films, fluorine-resin based films, composite films obtained by combining these resins, and laminated films obtained by laminating these films. Such a film is heat-sealed onto or adhered with an adhesive onto the plating layer or onto a chemical conversion treatment layer or the like (in the case such a chemical conversion treatment layer or the like is formed), thereby forming the coating layer.

Although the thickness of the coating layer formed from a film is suitably determined corresponding to the type of film, required level of performance, cost and the like, the thickness is, for example, within the range of 5 μm to 500 μm. The coating layer may have a thickness on the millimeter order corresponding to the application of the hot-dipped steel.

A coating layer formed from a coating material or film may be formed directly on the plating layer or may be formed by having another layer, such as a chemical conversion treatment layer, interposed there between. The coating layer may be formed from only a coating material or from only a film, or may be formed by combining and laminating a layer formed from a coating material and a layer formed from a film.

Moreover, a clear coating material may be coated and deposited while superimposing the coating layer to form a clear layer on the coating layer.

Since the hot-dipped steel produced according to the present embodiment inhibits the formation of an Mg-based oxide film on the surface layer of the plating layer and inhibits the formation of surface irregularities in the plating surface accompanying wrinkling and running, in comparison with conventional Mg-containing plated steel materials, the hot-dipped steel according to the present embodiment is able to demonstrate favorable chemical conversion treatment properties, favorable adhesion of a coating layer, and a favorable appearance of the surface following formation of the coating layer. Moreover, this hot-dipped steel demonstrates favorable corrosion resistance.

This hot-dipped steel can be employed in materials for automobiles, materials for home appliances and various types of other applications, and can be preferably employed in applications requiring corrosion resistance in particular.

EXAMPLES

The following provides an explanation of examples of the present invention.

Examples and Comparative Examples

A long piece of sheet steel 1*a* (made of low-carbon aluminum-killed steel) having a thickness of 0.80 mm and width of 1000 mm was used for the steel substrate 1. Furthermore, Ni-plating was carried out prior to carrying out hot-dip plating treatment on the sheet steel 1*a* in Examples 62 and 63, and a pre-plating layer was formed at an adhered amount (one side) of 0.5 $g/m^2$ in Example 62 and at an adhered amount (one side) of 2.0 $gm^2$ in Example 63. In Example 64, pre-plating treatment with Zn and 10% Cr was carried out, and a pre-plating layer was formed at an adhered amount (one side) of 1.0 $g/m^2$. Pre-plating treatment was not carried out in the other examples and comparative examples.

Hot-dip plating treatment was carried out on the sheet steel 1*a* using the hot-dip plating equipment shown in FIG. 1. Treatment conditions were as shown in Tables 1 to 4. The solidification starting temperatures shown in Tables 1 to 3 were derived from liquidus curves of a phase diagram of a Zn—Al two-component bath, and correspond to the contents of Al in each of the hot-dip plating bath compositions shown in Tables 1 to 3.

The temperature of the sheet steel 1*a* was 580° C. when the sheet steel 1*a* was immersed into the hot-dip plating bath 2.

When the sheet steel 1*a* was pulled out from the hot-dip plating bath 2, the sheet steel 1*a* was pulled out into an air atmosphere, after which gas wiping was also carried out in an air atmosphere. In Example 65, however, in addition to surrounding the transport route of the sheet steel 1*a* on the upstream side from the hot-dip plating bath 2 with a sealing box (the hollow member 22), spray nozzles 9 were arranged within this sealing box, and together with using a nitrogen atmosphere for the inside of this sealing box, gas wiping was carried out with nitrogen gas inside the hollow member 22.

In the heating apparatus 10, the sheet steel 1*a* was cooled until the surface temperature of the hot-dip plating metal (plating layer) reached 300° C. The cooling rate during cooling was 45° C./sec. In Examples 70 and 71, however, the cooling rate was changed in a temperature range in which the surface temperature of the hot-dip plating metal was 500° C. or higher, and the cooling rate during that time was 38° C./sec in Example 70 and 28° C./sec in Example 71.

The rolling reduction rate of temper rolling was 1%, and the elongation rate of the sheet steel 1*a* during shape correction was also 1%.

TABLE 1

| | | Hot-Dip Plating Bath Composition (wt %) | | | | | | | | | | | | Solidification starting time ° C. | Bath temp. ° C. | Adhered amt. (both sides) $g/m^2$ |
|---|---|---|---|---|---|---|---|---|---|---|---|---|---|---|---|---|
| | | Al % | Cr % | Si % | Si/Al ratio % | Mg % | Mg/Si ratio % | Fe % | Sr ppm | Ti % | B % | Ca ppm | Zn — | | | |
| Examples | 1 | 20.1 | 0.15 | 1.2 | 6.0 | 2.1 | 177 | 0.14 | 31 | — | — | — | Rem. | 472 | 504 | 148 |
| | 2 | 25.2 | 0.07 | 1.3 | 5.2 | 1.8 | 138 | 0.18 | 33 | — | — | — | Rem. | 488 | 521 | 153 |
| | 3 | 44.6 | 0.17 | 1.4 | 3.1 | 2.0 | 143 | 0.22 | 33 | — | — | — | Rem. | 545 | 578 | 147 |
| | 4 | 50.3 | 0.17 | 1.4 | 2.8 | 2.1 | 147 | 0.37 | 24 | — | — | — | Rem. | 560 | 590 | 149 |
| | 5 | 54.9 | 0.16 | 1.6 | 2.9 | 2.1 | 131 | 0.43 | 32 | — | — | — | Rem. | 571 | 600 | 153 |
| | 6 | 59.8 | 0.17 | 1.7 | 2.8 | 2.2 | 129 | 0.46 | 25 | — | — | — | Rem. | 583 | 612 | 147 |
| | 7 | 65.3 | 0.16 | 2.0 | 3.1 | 2.0 | 100 | 0.48 | 25 | — | — | — | Rem. | 596 | 625 | 147 |
| | 8 | 74.1 | 0.15 | 2.1 | 2.8 | 2.2 | 105 | 0.51 | 29 | — | — | — | Rem. | 614 | 645 | 148 |
| Comp. Ex. | 1 | 78.3 | 0.17 | 2.3 | 2.9 | 2.3 | 100 | 0.52 | 22 | — | — | — | Rem. | 623 | 655 | 154 |
| Examples | 9 | 55.1 | 0 | 1.7 | 3.1 | 1.9 | 112 | 0.42 | 26 | — | — | — | Rem. | 572 | 600 | 142 |
| | 10 | 54.7 | 0.05 | 1.8 | 3.3 | 2.2 | 122 | 0.41 | 20 | — | — | — | Rem. | 571 | 599 | 150 |
| | 11 | 55.0 | 0.1 | 1.6 | 2.9 | 2.2 | 138 | 0.40 | 26 | — | — | — | Rem. | 571 | 599 | 151 |
| | 12 | 53.9 | 0.2 | 1.4 | 2.6 | 2.4 | 171 | 0.44 | 36 | — | — | — | Rem. | 569 | 598 | 150 |
| | 13 | 53.5 | 0.5 | 1.6 | 3.0 | 2.1 | 131 | 0.43 | 36 | — | — | — | Rem. | 568 | 598 | 147 |
| | 14 | 54.6 | 0.9 | 1.7 | 3.1 | 2.4 | 141 | 0.43 | 27 | — | — | — | Rem. | 570 | 600 | 149 |
| | 15 | 53.4 | 1.2 | 1.9 | 3.6 | 2.2 | 116 | 0.43 | 39 | — | — | — | Rem. | 567 | 598 | 148 |
| Comp. Ex. | 2 | 55.9 | 0.14 | 0.2 | 0.4 | 2.0 | 1000 | 0.45 | 22 | — | — | — | Rem. | 574 | 600 | 148 |
| Examples | 16 | 56.7 | 0.17 | 0.5 | 0.9 | 1.5 | 300 | 0.43 | 38 | — | — | — | Rem. | 576 | 602 | 152 |
| | 17 | 54.9 | 0.17 | 2.5 | 4.6 | 2.2 | 88 | 0.41 | 36 | — | — | — | Rem. | 571 | 600 | 148 |
| | 18 | 56.7 | 0.18 | 4 | 7.1 | 3.0 | 75 | 0.45 | 39 | — | — | — | Rem. | 576 | 602 | 149 |

TABLE 2

| | | Hot-Dip Plating Bath Composition (wt %) | | | | | | | | | | | | Solidification | | Adhered |
|---|---|---|---|---|---|---|---|---|---|---|---|---|---|---|---|---|
| | | Al % | Cr % | Si % | Si/Al ratio % | Mg % | Mg/Si ratio % | Fe % | Sr ppm | Ti % | B % | Ca ppm | Zn — | starting time ° C. | Bath temp. ° C. | amt. (both sides) $g/m^2$ |
| Examples | 19 | 56.8 | 0.18 | 5.5 | 9.7 | 3.4 | 62 | 0.44 | 21 | — | — | — | Rem. | 576 | 602 | 151 |
| | 20 | 56.8 | 0.17 | 6.3 | 11.1 | 2.5 | 40 | 0.40 | 37 | — | — | — | Rem. | 576 | 602 | 152 |
| Comp. Ex. | 3 | 54.0 | 0.16 | 5.5 | 10.2 | 10.2 | 185 | 0.40 | 37 | — | — | — | Rem. | 569 | 599 | 152 |
| Examples | 21 | 54.7 | 0.14 | 1.5 | 2.7 | 0.4 | 27 | 0.44 | 20 | — | — | — | Rem. | 571 | 598 | 150 |
| | 20 | 44.6 | 0.16 | 1.2 | 2.7 | 0.6 | 50 | 0.44 | 19 | — | — | — | Rem. | 545 | 579 | 149 |
| | 21 | 44.1 | 0.15 | 1.1 | 2.5 | 3.0 | 273 | 0.44 | 31 | — | — | — | Rem. | 543 | 576 | 154 |
| | 22 | 44.9 | 0.14 | 1.4 | 3.1 | 4.2 | 300 | 0.44 | 26 | — | — | — | Rem. | 546 | 578 | 153 |
| | 23 | 49.4 | 0.14 | 1.3 | 2.6 | 0.7 | 54 | 0.42 | 38 | — | — | — | Rem. | 557 | 586 | 149 |
| | 24 | 49.8 | 0.15 | 1.4 | 2.8 | 3.0 | 214 | 0.40 | 39 | — | — | — | Rem. | 558 | 589 | 148 |
| | 25 | 49.7 | 0.16 | 1.5 | 3.0 | 4.5 | 300 | 0.41 | 37 | — | — | — | Rem. | 558 | 588 | 152 |
| | 26 | 53.1 | 0.15 | 1.6 | 3.0 | 0.8 | 50 | 0.40 | 40 | — | — | — | Rem. | 567 | 599 | 150 |
| | 27 | 56.1 | 0.18 | 1.5 | 2.7 | 1.5 | 100 | 0.45 | 28 | — | — | — | Rem. | 574 | 600 | 150 |
| | 28 | 56.6 | 0.16 | 1.8 | 3.2 | 3.0 | 167 | 0.41 | 23 | — | — | — | Rem. | 575 | 602 | 147 |
| | 29 | 55.7 | 0.17 | 1.4 | 2.5 | 4.0 | 286 | 0.44 | 39 | — | — | — | Rem. | 573 | 599 | 147 |
| | 30 | 55.3 | 0.14 | 1.7 | 3.1 | 5.1 | 300 | 0.45 | 25 | — | — | — | Rem. | 572 | 598 | 148 |
| | 31 | 61.3 | 0.19 | 1.7 | 2.8 | 0.9 | 53 | 0.42 | 41 | — | — | — | Rem. | 586 | 612 | 152 |
| | 32 | 58.8 | 0.17 | 1.7 | 2.9 | 3.1 | 182 | 0.44 | 29 | — | — | — | Rem. | 581 | 608 | 149 |
| | 33 | 60.4 | 0.18 | 1.9 | 3.1 | 5.2 | 274 | 0.41 | 40 | — | — | — | Rem. | 584 | 610 | 147 |
| | 34 | 65.2 | 0.19 | 1.9 | 2.9 | 1.0 | 53 | 0.44 | 39 | — | — | — | Rem. | 595 | 621 | 149 |
| | 35 | 66.0 | 0.17 | 2.1 | 3.2 | 3.5 | 167 | 0.43 | 22 | — | — | — | Rem. | 597 | 624 | 151 |

TABLE 3

| | | Hot-Dip Plating Bath Composition (wt %) | | | | | | | | | | | | Solidification | | Adhered |
|---|---|---|---|---|---|---|---|---|---|---|---|---|---|---|---|---|
| | | Al % | Cr % | Si % | Si/Al ratio % | Mg % | Mg/Si ratio % | Fe % | Sr ppm | Ti % | B % | Ca ppm | Zn — | starting time ° C. | Bath temp. ° C. | amt. (both sides) $g/m^2$ |
| Examples | 36 | 65.5 | 0.18 | 2.3 | 3.5 | 6.8 | 296 | 0.42 | 32 | — | — | — | Rem. | 596 | 622 | 150 |
| | 37 | 55.0 | 0.15 | 2.5 | 4.5 | 1.4 | 56 | 0.42 | 39 | — | — | — | Rem. | 571 | 598 | 150 |
| | 38 | 53.0 | 0.16 | 2.5 | 4.7 | 4.5 | 180 | 0.45 | 30 | — | — | — | Rem. | 566 | 597 | 153 |
| | 39 | 54.0 | 0.17 | 2.7 | 5.0 | 8.1 | 300 | 0.40 | 33 | — | — | — | Rem. | 569 | 600 | 152 |
| | 40 | 52.0 | 0.15 | 3.9 | 7.5 | 2.0 | 51 | 0.46 | 38 | — | — | — | Rem. | 564 | 595 | 155 |
| | 41 | 51.0 | 0.18 | 4.1 | 8.0 | 3.5 | 85 | 0.43 | 40 | — | — | — | Rem. | 561 | 593 | 154 |
| | 42 | 53.0 | 0.13 | 3.9 | 7.4 | 6.5 | 167 | 0.42 | 36 | — | — | — | Rem. | 566 | 595 | 152 |
| | 43 | 55.0 | 0.19 | 4.2 | 7.5 | 10.0 | 238 | 0.43 | 42 | — | — | — | Rem. | 571 | 598 | 153 |
| Comp. Ex. | 4 | 56.8 | 0.16 | 1.5 | 2.6 | 7.5 | 500 | 0.40 | 32 | — | — | — | Rem. | 576 | 602 | 151 |
| Examples | 44 | 53.9 | 0.17 | 1.8 | 3.3 | 2.3 | 128 | 0.46 | 0 | — | — | — | Rem. | 569 | 597 | 148 |
| | 45 | 53.3 | 0.15 | 1.7 | 3.2 | 2.5 | 147 | 0.44 | 0.5 | — | — | — | Rem. | 567 | 598 | 147 |
| | 46 | 56.5 | 0.15 | 1.8 | 3.2 | 2.4 | 133 | 0.42 | 1 | — | — | — | Rem. | 575 | 601 | 153 |
| | 47 | 56.5 | 0.16 | 1.4 | 2.5 | 2.3 | 164 | 0.45 | 9 | — | — | — | Rem. | 575 | 602 | 152 |
| | 48 | 56.1 | 0.18 | 1.6 | 2.9 | 1.9 | 119 | 0.44 | 53 | — | — | — | Rem. | 574 | 600 | 153 |
| | 49 | 54.5 | 0.17 | 1.5 | 2.8 | 2.4 | 160 | 0.40 | 98 | — | — | — | Rem. | 570 | 600 | 149 |
| | 50 | 54.5 | 0.16 | 1.7 | 3.1 | 1.9 | 112 | 0.45 | 248 | — | — | — | Rem. | 570 | 598 | 148 |
| | 51 | 54.9 | 0.17 | 1.8 | 3.3 | 2.4 | 133 | 0.40 | 495 | — | — | — | Rem. | 571 | 597 | 149 |
| | 52 | 55.4 | 0.16 | 1.6 | 2.9 | 2.2 | 138 | 0.41 | 1000 | — | — | — | Rem. | 572 | 598 | 150 |
| | 53 | 55.3 | 0.17 | 1.7 | 3.1 | 2.3 | 135 | 0.44 | 1060 | — | — | — | Rem. | 572 | 599 | 152 |
| | 54 | 56.7 | 0.15 | 1.6 | 2.8 | 1.9 | 119 | 0.41 | 23 | 0.0005 | — | — | Rem. | 576 | 602 | 147 |

TABLE 4

| | | Hot-Dip Plating Bath Composition (wt %) | | | | | | | | | | | | Solidification | | Adhered |
|---|---|---|---|---|---|---|---|---|---|---|---|---|---|---|---|---|
| | | Al % | Cr % | Si % | Si/Al ratio % | Mg % | Mg/Si ratio % | Fe % | Sr ppm | Ti % | B % | Ca ppm | Zn — | starting time ° C. | Bath temp. ° C. | amt. (both sides) $g/m^2$ |
| Examples | 55 | 55.7 | 0.17 | 1.7 | 3.1 | 2.2 | 129 | 0.44 | 27 | 0.008 | — | — | Rem. | 573 | 599 | 153 |
| | 56 | 56.6 | 0.15 | 1.5 | 2.7 | 1.8 | 120 | 0.43 | 34 | 0.03 | 0.1 | — | Rem. | 575 | 602 | 148 |
| | 57 | 56.0 | 0.15 | 1.6 | 2.9 | 2.0 | 125 | 0.42 | 33 | 0.1 | 0.0005 | — | Rem. | 574 | 601 | 150 |
| | 58 | 56.6 | 0.16 | 1.6 | 2.8 | 1.8 | 113 | 0.43 | 24 | — | — | — | Rem. | 575 | 602 | 92 |
| | 59 | 54.1 | 0.15 | 1.5 | 2.8 | 2.2 | 147 | 0.43 | 26 | — | — | — | Rem. | 569 | 599 | 75 |
| | 60 | 56.9 | 0.17 | 1.5 | 2.6 | 2.1 | 140 | 0.43 | 32 | — | — | — | Rem. | 576 | 602 | 42 |
| | 61 | 55.6 | 0.16 | 1.4 | 2.5 | 2.4 | 171 | 0.40 | 36 | — | — | — | Rem. | 573 | 590 | 150 |
| | 62 | 53.6 | 0.14 | 1.6 | 3.0 | 2.0 | 125 | 0.40 | 38 | — | — | — | Rem. | 568 | 598 | 146 |

TABLE 4-continued

| | Hot-Dip Plating Bath Composition (wt %) | | | | | | | | | | | | Solidification | | Adhered |
|---|---|---|---|---|---|---|---|---|---|---|---|---|---|---|---|
| | Al % | Cr % | Si % | Si/Al ratio % | Mg % | Mg/Si ratio % | Fe % | Sr ppm | Ti % | B % | Ca ppm | Zn — | starting time ° C. | Bath temp. ° C. | amt. (both sides) g/m$^2$ |
| 63 | 56.9 | 0.15 | 1.8 | 3.2 | 2.3 | 128 | 0.41 | 28 | — | — | — | Rem. | 576 | 602 | 151 |
| 64 | 53.7 | 0.15 | 1.9 | 3.5 | 2.2 | 116 | 0.44 | 31 | — | — | — | Rem. | 568 | 598 | 152 |
| 65 | 53.9 | 0.16 | 1.4 | 2.6 | 2.1 | 150 | 0.43 | 2 | — | — | — | Rem. | 569 | 599 | 150 |
| 66 | 52.0 | 0.16 | 1.6 | 3.1 | 1.9 | 119 | 0.43 | 11 | — | — | 100 | Rem. | 564 | 599 | 148 |
| 67 | 55.0 | 0.17 | 1.7 | 3.1 | 2.2 | 129 | 0.42 | 9 | — | — | 450 | Rem. | 571 | 599 | 150 |
| 68 | 54.1 | 0.16 | 1.5 | 2.8 | 2.0 | 133 | 0.43 | 12 | — | — | 2000 | Rem. | 569 | 599 | 153 |
| 69 | 54.3 | 0.16 | 1.6 | 2.9 | 2.1 | 131 | 0.42 | 10 | — | — | 5000 | Rem. | 570 | 600 | 152 |
| 70 | 53.0 | 0.18 | 1.6 | 3.0 | 1.8 | 113 | 0.43 | 35 | — | — | — | Rem. | 566 | 599 | 154 |
| 71 | 54.2 | 0.16 | 1.5 | 2.8 | 2.2 | 147 | 0.42 | 30 | — | — | — | Rem. | 569 | 599 | 150 |
| 72 | 54.8 | 0.13 | 1.6 | 2.9 | 2.1 | 131 | 0.05 | 32 | — | — | — | Rem. | 571 | 599 | 152 |
| 73 | 54.2 | 0.14 | 1.5 | 2.8 | 1.8 | 120 | 1.10 | 34. | — | — | — | Rem. | 569 | 600 | 151 |

Evaluation Testing

The following evaluation testing was carried out on the hot-dipped steel (hot-dipped sheet steel) obtained in each of the examples and comparative examples.

(Evaluation of Volume Percentage of Si—Mg Phase)

A sample was obtained by cutting the hot-dipped sheet steel. After embedding the sample in resin so as to expose the cut surface, the cut surface was polished to a mirrored finish. When the cut surface was observed with an electron microscope, the Si—Mg phase was clearly observed to be distributed in the plating layer.

Figure 4A:
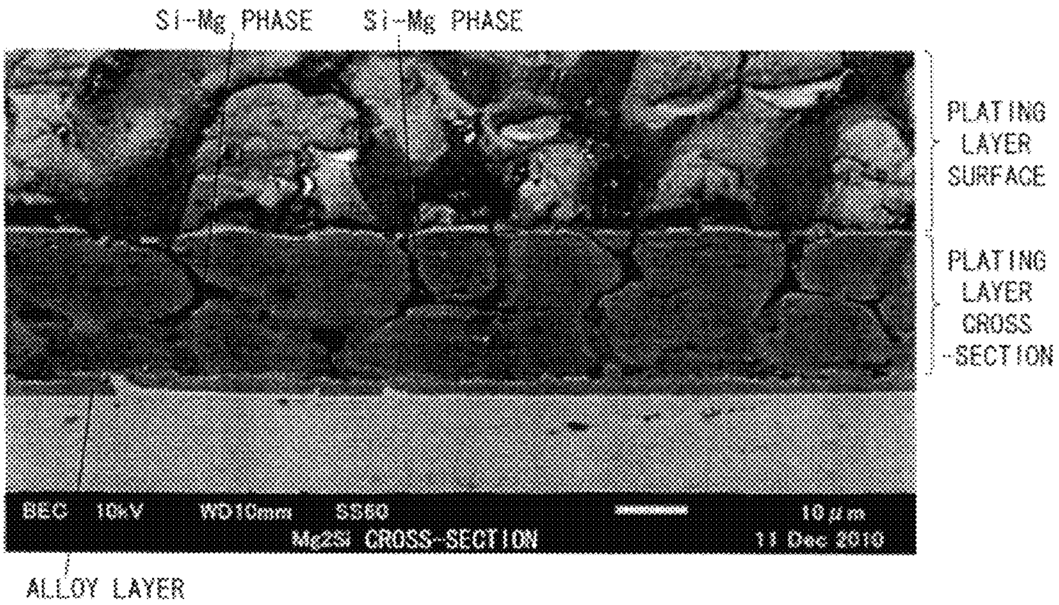
FIG. 4(*a*) is an image obtained by photographing a cross-sectional surface of hot-dipped sheet steel obtained Example 5 with an electron microscope, and FIG. 4(*b*) is a graph indicating the results of elemental analysis of an Si—Mg phase in Example 5.
Figure 4B:
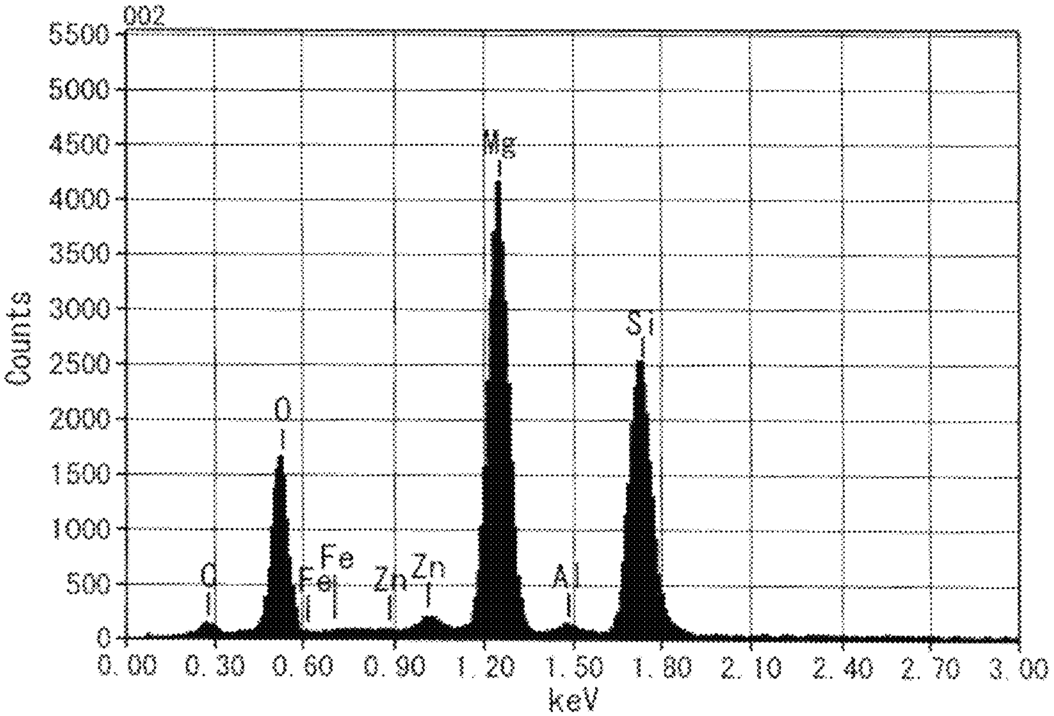

An image obtained by photographing a cut surface of the hot-dipped sheet steel obtained in Example 5 with an electron microscope is shown in FIG. 4(*a*). Moreover, elemental analysis was carried out on a portion in which precipitation of the Si—Mg phase was observed using an energy-dispersive X-ray spectrometer (EDS). The result is shown in FIG. 4(*b*). According to this result, only the two elements of Mg and Si can be seen to be strongly detected. Although oxygen (O) was also detected, this is the result of having detected oxygen that adsorbed to the sample during sample preparation.

Percent area (%) of the Si—Mg phase in the cut surface was measured by carrying out image analysis based on the photographed image over a range of a length of 20 mm in a direction perpendicular to the direction of thickness on the cut surface of the plating layer. The Si—Mg phase was colored dark gray, and was able to be easily identified by image analysis since it was clearly distinguished from other phases.

The volume percentage of the Si—Mg phase was evaluated by considering the percent area (%) obtained in this manner to coincide with the volume percentage of the Si—Mg phase. The results are shown in Tables 5 to 8.

(Evaluation of Weight Ratio of Amount of Mg in Si—Mg Phase to Total Mg Weight)

The weight ratio of the amount of Mg in the Si—Mg phase to the total weight of Mg in the plating layer was calculated according to the previously described formulas (1) to (3). The results are shown in Tables 4 to 6.

(Evaluation of Amount of Mg in Surface Layer)

Elemental analysis in the direction of depth (direction of thickness of plating layer) was carried out on components contained in the plating layer of the hot-dipped sheet steel by glow discharge optical emission spectroscopy (GD-OES). In carrying out measurement, emission intensity of elements contained in the plating layer were measured under conditions consisting of a diameter of the measured area of 4 mm, output of 35 W, use of Ar gas for the measurement atmosphere, measurement pressure of 600 Pa, use of normal sputtering for the discharge mode, duty cycle of 0.1, analysis time of 80 seconds and sampling time of 0.02 sec/point. In order to convert the resulting emission intensity values to quantitative concentration values (concentration as wt %), elemental analyses were also separately carried out on reference samples such as 7000 series Al alloy or steel materials having known component concentrations. Furthermore, since GD-OES data is in the form of changes in emission intensity versus sputtering time, sputter depth was measured by observing cross-sections of the samples following completion of measurement, sputtering speed was calculated by dividing the resulting sputter depth by total sputtering time, and the depth location of the plating layer was specified in a GD-OES depth direction profile.

Figure 5A:
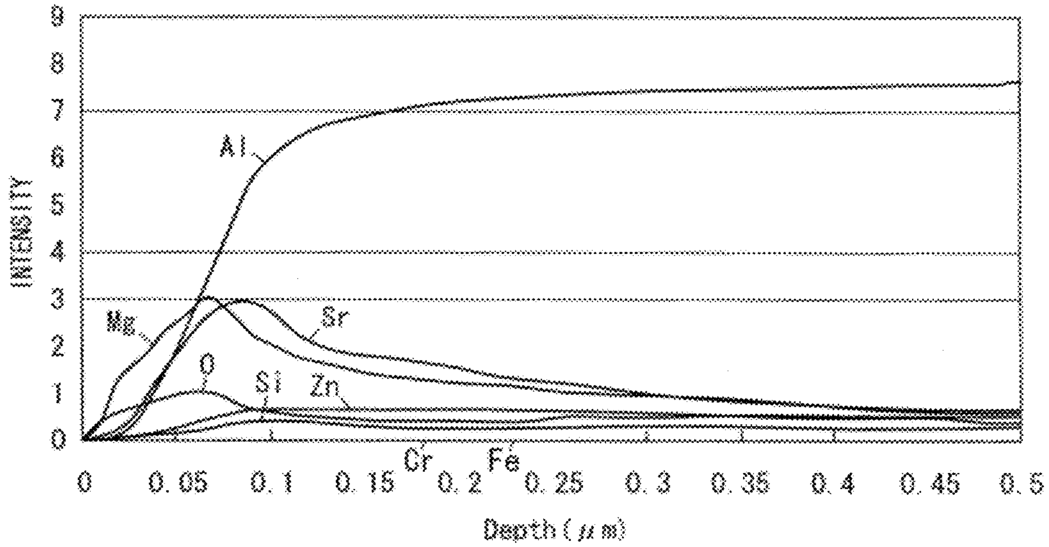
FIG. 5(*a*) is a graph indicating the results of analyzing the direction of plating layer depth with a glow discharge optical emission spectrometer for Example 5, and FIG. 5(*b*) indicates the results for Example 44.
Figure 5B:
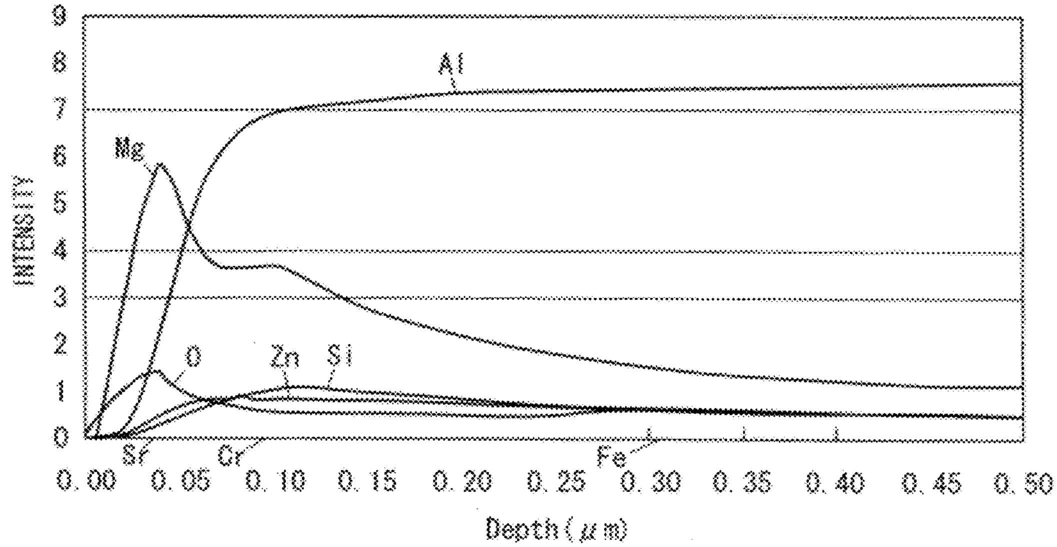

Analysis results for Example 5 and Example 44 are shown in FIGS. 5(*a*) and 5(*b*), respectively. According to the results, the concentration of Mg in the surface layer of the plating layer was able to be confirmed to increase rapidly in Example 44.

On the basis of this result, the content of Mg was derived in an area having a size of 4 mm in diameter and a depth of 50 nm in the outermost layer of the plating layer having a depth of 50 nm. The results are shown in Tables 5 to 8.

(Evaluation of Amount of Cr in Surface Layer)

Integrated values of Cr emission intensity were measured in an area having a size of 4 mm in diameter and a depth of 50 nm from the outermost surface of the plating layer by GD-OES in the same manner as in the case of "Evaluation of Amount of Mg in Surface Layer". Integrated values of Cr emission intensity were similarly measured for the entire plating layer, and the ratios of the integrated values of Cr emission intensity in the above-mentioned area to the values for the entire plating layer were determined. Cr content was then calculated in an area having a size of 4 mm in diameter and a depth of 50 nm from the outermost surface of the plating layer based on the ratio of the integrated values of Cr emission intensity and chemical analysis values of the amount of Cr in the entire plating layer as determined by ICP. The results are shown in Tables 5 to 8.

(Evaluation of Area Ratio of Si—Mg Phase on Surface of Plating Layer)

Figure 6:
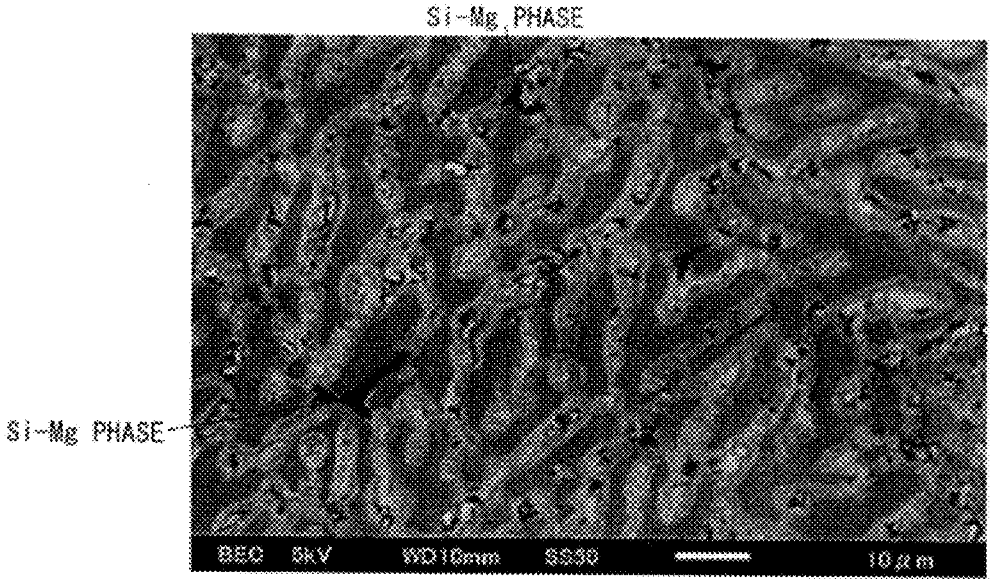
FIG. 6 is an image obtained by photographing the surface of a plating layer in hot-dipped sheet steel obtained in Example 5 with an electron microscope.

The surface of the plating layer was observed with an electron microscope. A photograph of the surface of the plating layer of Example 5 as captured with an electron microscope is shown in FIG. 6. According to this observation result, the Si—Mg phase was clearly observed to be distributed on the surface of the plating layer. On the basis of this result, the area of the Si—Mg phase on the surface of the plating layer was measured, and the area ratio of the Si—Mg phase on the surface of the plating layer was calculated on the basis thereof. The results are shown in Tables 5 to 8.

(Evaluation of Alloy Layer)

A sample was obtained by cutting the hot-dipped sheet steel. After embedding this sample in resin so as to expose the cut surface, the cut surface was polished to a mirrored finish. An alloy layer was present in this cut surface that was interposed at the interface between the plating layer and the sheet steel 1*a*. The thickness of this alloy layer was measured. Moreover, a portion of the polished surface measuring 10 μm×20 μm was sampled from the polished surface with a focused ion beam device, and a microsample was prepared that was processed to a thickness of 50 nm or less. The Cr concentration in the alloy layer of this microsample was then analyzed using an energy-dispersive X-ray spectrometer (EDS) under conditions of an acceleration voltage of 200 kV and probe diameter of 1 nm.

The ratio of the weight ratio of Cr in the alloy layer to the weight ratio of Cr in the plating layer was then calculated based on this result. The results are shown in Tables 5 to 8.

TABLE 5

| | | Si—Mg phase volume percentage vol % | Mg weight ratio % | Surface layer Mg content wt % | Surface layer Cr content ppm by weight | Si—Mg phase area ratio on plating layer surface area % | Alloy layer Thickness μm | Alloy layer Cr content ratio — |
|---|---|---|---|---|---|---|---|---|
| Examples | 1 | 4.54 | 42.9 | 33.2 | 308 | 7.0 | 0.03 | 0.5 |
| | 2 | 3.65 | 42.3 | 32.9 | 139 | 6.1 | 0.06 | 2.1 |
| | 3 | 3.21 | 39.3 | 29.8 | 330 | 4.2 | 0.50 | 7.5 |
| | 4 | 3.09 | 38.9 | 29.5 | 333 | 3.4 | 1.00 | 14.6 |
| | 5 | 2.99 | 38.5 | 29.1 | 312 | 3.2 | 1.50 | 22.9 |
| | 6 | 2.60 | 33.7 | 29.0 | 321 | 3.3 | 2.00 | 29.4 |
| | 7 | 2.20 | 33.3 | 28.0 | 298 | 2.9 | 2.50 | 38.8 |
| | 8 | 1.35 | 20.6 | 29.1 | 266 | 4.0 | 2.90 | 49.2 |
| Comp. Ex. | 1 | 0.18 | 2.8 | 61.2 | 283 | 5.0 | 5.10 | 76.3 |
| Examples | 9 | 0.26 | 3.7 | 62.0 | 0 | 32.0 | 0.00 | — |
| | 10 | 0.38 | 4.7 | 31.4 | 103 | 4.1 | 0.30 | 15.0 |
| | 11 | 1.50 | 18.5 | 31.5 | 196 | 5.0 | 0.40 | 10.0 |
| | 12 | 3.00 | 33.6 | 31.8 | 395 | 6.6 | 0.50 | 6.3 |
| | 13 | 3.52 | 44.7 | 30.9 | 413 | 7.4 | 1.50 | 7.5 |
| | 14 | 4.64 | 52.4 | 33.9 | 488 | 11.1 | 1.60 | 4.4 |
| | 15 | 7.20 | 87.7 | 16.1 | 2380 | 13.0 | 2.00 | 4.2 |
| Comp. Ex. | 2 | 0.05 | 0.7 | 74.5 | 227 | 8.5 | 6.00 | 104.5 |
| Examples | 16 | 0.35 | 6.3 | 34.5 | 307 | 2.6 | 3.00 | 44.5 |
| | 17 | 3.12 | 38.8 | 29.8 | 316 | 6.6 | 2.00 | 29.8 |
| | 18 | 4.19 | 40.0 | 29.3 | 335 | 6.7 | 1.50 | 21.4 |

TABLE 6

| | | Si—Mg phase volume percentage vol % | Mg weight ratio % | Surface layer Mg content wt % | Surface layer Cr content ppm by weight | Si—Mg phase area ratio on plating layer surface area % | Alloy layer Thickness μm | Alloy layer Cr content ratio — |
|---|---|---|---|---|---|---|---|---|
| Examples | 19 | 4.70 | 40.4 | 30.6 | 346 | 8.9 | 1.20 | 16.7 |
| | 20 | 3.37 | 39.4 | 29.6 | 330 | 8.4 | 1.00 | 14.7 |
| Comp. Ex. | 3 | 16.80 | 51.2 | 66.0 | 305 | 32.0 | 1.50 | 23.4 |
| Examples | 21 | 0.20 | 13.2 | 25.0 | 269 | 0.9 | 1.80 | 31.3 |
| | 20 | 0.77 | 30.9 | 25.7 | 311 | 1.7 | 1.60 | 24.4 |
| | 21 | 2.94 | 24.1 | 35.2 | 282 | 5.0 | 1.70 | 28.4 |
| | 22 | 3.69 | 22.1 | 39.5 | 274 | 9.2 | 1.30 | 22.7 |
| | 23 | 0.86 | 31.1 | 26.2 | 270 | 1.7 | 1.60 | 28.0 |
| | 24 | 3.57 | 30.9 | 35.5 | 275 | 7.9 | 1.50 | 25.8 |
| | 25 | 3.79 | 22.3 | 38.2 | 315 | 8.2 | 1.30 | 19.8 |
| | 26 | 0.97 | 31.9 | 25.8 | 281 | 1.3 | 1.60 | 21.5 |
| | 27 | 2.05 | 37.1 | 29.4 | 336 | 5.7 | 1.70 | 24.0 |
| | 28 | 4.27 | 39.7 | 34.2 | 305 | 8.5 | 1.50 | 23.5 |
| | 29 | 3.33 | 23.2 | 38.4 | 321 | 9.0 | 1.30 | 19.5 |
| | 30 | 4.01 | 22.2 | 38.8 | 273 | 8.4 | 1.40 | 24.4 |
| | 31 | 1.03 | 32.4 | 25.3 | 363 | 1.8 | 1.60 | 21.1 |
| | 32 | 4.05 | 37.3 | 31.6 | 325 | 4.9 | 1.50 | 22.1 |
| | 33 | 4.36 | 25.1 | 34.7 | 345 | 5.2 | 1.30 | 18.1 |
| | 34 | 1.00 | 29.8 | 25.9 | 359 | 3.0 | 1.60 | 21.3 |
| | 35 | 3.87 | 34.4 | 33.4 | 334 | 8.0 | 1.50 | 21.5 |

TABLE 7

| | | Si—Mg phase volume percentage vol % | Mg weight ratio % | Surface layer Mg content wt % | Surface layer Cr content ppm by weight | Si—Mg phase area ratio on plating layer surface area % | Alloy layer Thickness μm | Alloy layer Cr content ratio — |
|---|---|---|---|---|---|---|---|---|
| Examples | 36 | 4.98 | 23.8 | 38.9 | 341 | 9.5 | 1.30 | 18.4 |
| | 37 | 1.87 | 36.3 | 28.2 | 286 | 5.4 | 1.40 | 23.3 |
| | 38 | 6.27 | 38.4 | 33.7 | 304 | 7.5 | 1.60 | 25.0 |
| | 39 | 6.38 | 23.0 | 38.0 | 322 | 8.0 | 1.80 | 26.5 |
| | 40 | 2.84 | 38.2 | 27.0 | 283 | 3.7 | 1.70 | 28.3 |
| | 41 | 5.19 | 40.3 | 32.8 | 344 | 10.4 | 1.60 | 22.2 |
| | 42 | 8.00 | 35.4 | 37.1 | 245 | 11.0 | 1.50 | 28.8 |
| | 43 | 9.69 | 29.9 | 39.9 | 366 | 12.6 | 1.40 | 18.4 |
| Comp. Ex. | 4 | 0.75 | 2.9 | 70.1 | 308 | 36.0 | 1.20 | 18.8 |
| Examples | 44 | 0.21 | 3.2 | 67.3 | 332 | 34.0 | 1.70 | 24.4 |
| | 45 | 0.35 | 3.8 | 63.2 | 285 | 31.0 | 1.20 | 20.2 |
| | 46 | 0.98 | 11.3 | 36.5 | 288 | 12.0 | 1.80 | 29.4 |
| | 47 | 1.35 | 16.1 | 34.9 | 311 | 9.5 | 1.30 | 20.1 |
| | 48 | 2.67 | 38.3 | 31.1 | 340 | 7.2 | 1.40 | 19.8 |
| | 49 | 3.48 | 39.2 | 30.3 | 328 | 4.0 | 1.60 | 23.3 |
| | 50 | 3.60 | 51.0 | 27.9 | 307 | 2.0 | 1.40 | 21.8 |
| | 51 | 3.80 | 43.1 | 28.1 | 320 | 1.1 | 1.50 | 22.4 |
| | 52 | 3.45 | 42.7 | 28.3 | 305 | 0.8 | 1.48 | 23.1 |
| | 53 | 3.60 | 42.7 | 28.0 | 329 | 0.5 | 1.80 | 25.9 |
| | 54 | 2.62 | 37.9 | 30.3 | 295 | 5.5 | 1.50 | 24.2 |

TABLE 8

| | | Si—Mg phase volume percentage vol % | Mg weight ratio % | Surface layer Mg content wt % | Surface layer Cr content ppm by weight | Si—Mg phase area ratio on plating layer surface area % | Alloy layer Thickness μm | Alloy layer Cr content ratio — |
|---|---|---|---|---|---|---|---|---|
| Examples | 55 | 3.12 | 38.8 | 33.3 | 316 | 9.0 | 1.60 | 24.1 |
| | 56 | 2.47 | 37.6 | 29.1 | 283 | 3.5 | 1.40 | 23.6 |
| | 57 | 2.45 | 33.5 | 29 | 286 | 3.5 | 1.42 | 23.7 |
| | 58 | 2.48 | 37.8 | 29.4 | 309 | 4.7 | 1.50 | 23.2 |
| | 59 | 3.15 | 38.5 | 30.2 | 278 | 3.8 | 1.60 | 27.2 |
| | 60 | 2.95 | 38.7 | 29.2 | 333 | 3.2 | 1.40 | 20.2 |
| | 61 | 3.42 | 38.9 | 30.8 | 320 | 4.1 | 1.90 | 13.7 |
| | 62 | 2.85 | 38.1 | 30.7 | 268 | 5.4 | 1.70 | 29.9 |
| | 63 | 3.21 | 38.7 | 32.1 | 287 | 7.4 | 2.00 | 32.6 |
| | 64 | 3.16 | 38.6 | 31.9 | 282 | 7.6 | 2.30 | 37.7 |
| | 65 | 3.03 | 38.6 | 32.2 | 314 | 7.0 | 1.50 | 22.8 |
| | 66 | 2.78 | 38.4 | 30.5 | 315 | 6.1 | 1.40 | 21.3 |
| | 67 | 3.15 | 38.9 | 28.9 | 324 | 3.1 | 1.60 | 23.5 |
| | 68 | 2.87 | 38.4 | 28.9 | 314 | 2.7 | 1.50 | 22.8 |
| | 69 | 2.75 | 35.2 | 28.6 | 306 | 2.1 | 1.45 | 22.7 |
| | 70 | 2.61 | 38.3 | 27.7 | 346 | 2.3 | 1.40 | 19.4 |
| | 71 | 3.17 | 38.7 | 28.9 | 305 | 1.7 | 1.50 | 23.4 |
| | 72 | 2.95 | 38.0 | 30.8 | 249 | 5.0 | 1.10 | 21.2 |
| | 73 | 2.53 | 37.5 | 31.2 | 245 | 6.1 | 3.50 | 62.5 |

(Appearance Evaluation)

Figure 7A:
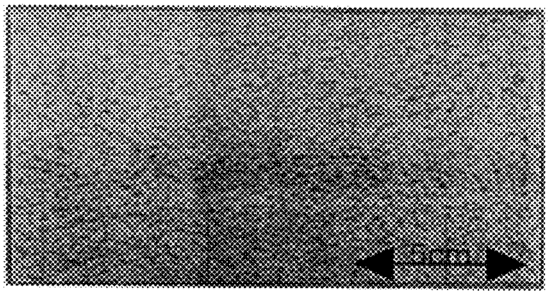
FIG. 7(*a*) shows a photograph of the appearance of a plating layer for Example 5, and FIG. 7(*b*) shows the same for Example 9.
Figure 7B:
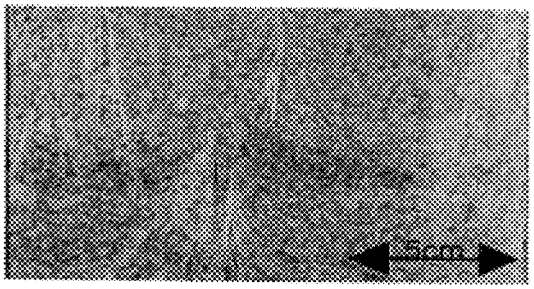
Figure 8A:
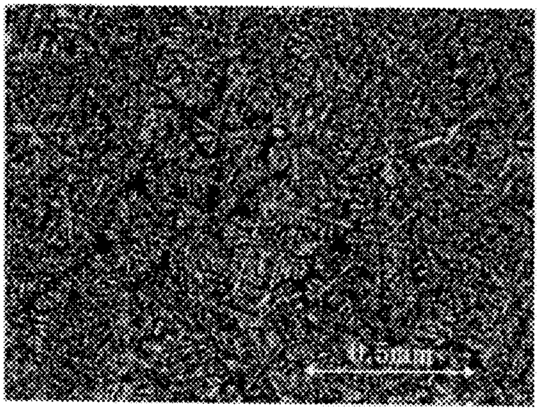
FIG. 8(*a*) shows a photograph obtained with a light microscope of the appearance of a plating layer for Example 56, and FIG. 8(*b*) shows the same for Example 5.
Figure 8B:
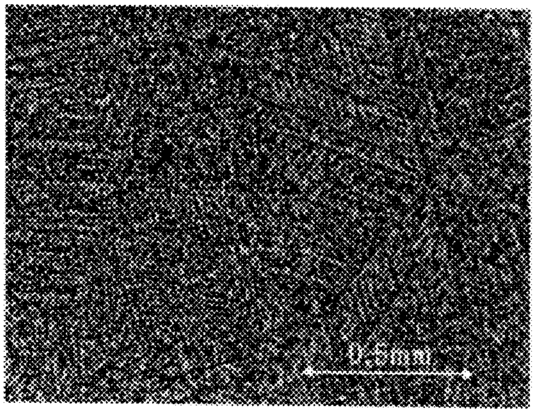
Figure 9:
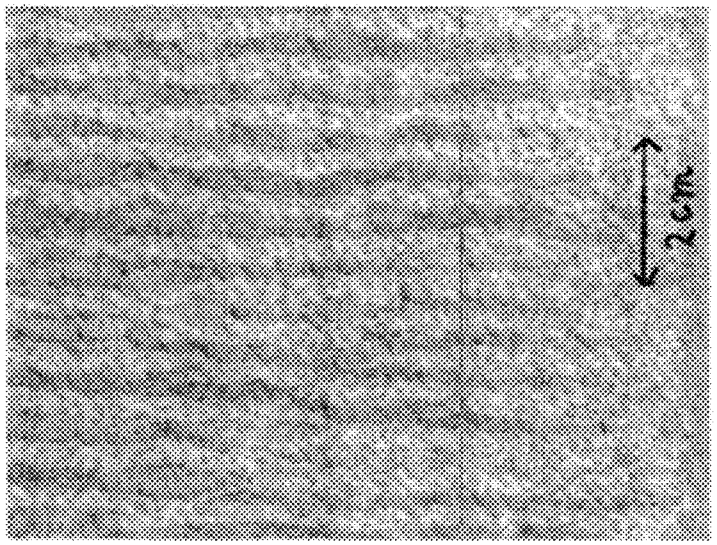
FIG. 9 shows a photograph of the appearance of a plating layer for Example 44.

The appearance of the surface of the plated layer of the hot-dipped sheet steel was observed visually and microscopically. FIG. 7(*a*) shows a photograph of the surface of the plating layer in Example 5. FIG. 7(*b*) shows a photograph of the surface of the plating layer in Example 9. FIG. 8(*a*) shows a photomicrograph of the surface of the plating layer in Example 56. FIG. 8(*b*) shows a photomicrograph of the surface of the plating layer in Example 5. FIG. 9 shows a photograph of the appearance of the plating layer in Example 44.

The degree of wrinkling of the surface of the plating layer was evaluated according to the following criteria based on the observation results. The results are shown in Tables 9 to 12.

◎: Not wrinkles observed

○: slight wrinkling (degree of wrinkling shown in FIG. 7(*a*))

Δ: Moderate wrinkling (better than that shown in FIG. 7(*b*))

x: Marked wrinkling (degree of wrinkling shown in FIG. 7(*b*))

Wrinkling evaluated as being intermediate to ○ and Δ was evaluated as ○-Δ.

Moreover, the degree of running on the surface of the plating layer was evaluated according to the following criteria based on the observation results. The results are shown in Tables 9 to 12.

○: Running not observed x: Running observed (degree of running shown in FIG. 9)

Moreover, the degree of dross adhered to the plating surface was evaluated according to the following criteria based on the observation results. The results are shown in Tables 9 to 12.

○: No adherence of dross accompanying surface irregularities on surface of plating layer or adherence of dross accompanying surface irregularities observed at less than 5 locations per $m^2$ x: Adherence of dross accompanying surface irregularities on surface of plating layer observed at 5 or more locations per $m^2$ Moreover, when appearance characteristics of the plating layer other than wrinkling, running and dross were observed, coarsening of spangle structure was observed in Example 72 (see column entitled "Other").

(Evaluation of Bare Corrosion Resistance)

A sample having dimensions of 100 mm×50 mm when viewed overhead was obtained by cutting the hot-dipped sheet steel. A salt spray test in compliance with JIS Z2371 was carried out on the sample for 20 days. Plating corrosion loss of the sample was measured following the salt spray test. When measuring this plating corrosion loss, corrosion products were dissolved and removed from the sample by immersing the sample following the salt spray test for 3 minutes in a treatment bath having a $CrO_3$ concentration of 200 g/L at a temperature of 80° C. The reduction in weight of the sample after treatment from the weight of the sample before the salt spray test was used for plating corrosion loss.

Bare corrosion resistance was then evaluated as shown below based on this result. The results are shown in Tables 9 to 12.

◎: Plating corrosion loss of 5 g/$m^2$ or less

○: Plating corrosion loss of greater than 5 g/$m^2$ to 10 g/$m^2$ or less

Δ: Plating corrosion loss of greater than 10 g/$m^2$ to 20 g/$m^2$ or less x: Plating corrosion loss of greater than 20 g/$m^2$ (Evaluation of Corrosion Resistance after Coating)

A chemical conversion treatment layer having a chromium content of 30 mg/$m^2$ to 50 mg/$m^2$ was formed by coating a chemical conversion treatment agent (Product No. 1300AN, Nihon Parkerizing Co., Ltd.) composed of a chromate-containing chemical conversion treatment agent onto both sides of the hot-dipped sheet steel. An epoxy-based undercoating material (Product No. P•152S, Nippon Paint Co., Ltd.) was coated to a thickness of 5 μm on the chemical conversion treatment layer followed by heating and baking to form an undercoating layer. A polyester-based overcoating material (trade name: Nippe Supercoat 300HQ, Nippon Paint Co., Ltd.) was coated to a thickness of 20 μm on the undercoating layer followed by drying and baking to form an overcoating layer.

A sample having dimensions of 100 mm×50 mm when viewed overhead was obtained by cutting the coated hot-dipped sheet steel. This sample was then exposed to outdoor conditions at a location along the Okinawa coastline for 1 year, followed by observing the cut ends and coated surface of the sample and evaluating corrosion status according to the following criteria. The results are shown in Tables 9 to 12.

<Cut Ends>

◎: No blistering observed

○: Blisters having width of less than 2 mm

Δ: Blisters having width of 2 mm or more to less than 5 mm x: Blisters having width of 5 mm or more <Coated Surface>

○: Formation of white rust not observed

Δ: Scattered white rust present x: Large amount of white rust present

Furthermore, white rust on the coated surface was thought to have occurred due to protrusions on the plating layer or dross adhered to the plating layer, thereby causing the thickness of the coating layer to partially decrease or resulting in the protrusions or dross penetrating the plating layer.

(Evaluation of Bending Workability)

A sample having dimensions of 30 mm×40 mm when viewed from overhead was obtained by cutting the hot-dipped sheet steel. This sample was then subjected to 8T bending. The apex of the bent portion of the sample was observed with a microscope. Bending workability was then evaluated according to the following criteria on the basis of this result. Furthermore, 8T bending is equivalent to the case of "bending inside clearance" being "8 sheets of the indicated thickness" in Table 17 of Section 13.2.2 of JIS G3322. The results are shown in Tables 9 to 12.

◎: No cracks observed

○: 1 or more to less than 5 cracks observed

Δ: 5 or more to less than 20 cracks observed x: 20 or more cracks observed (Evaluation of Corrosion Resistance after Bending)

A sample having dimensions of 30 mm×40 mm when viewed from overhead was obtained by cutting the hot-dipped sheet steel. This sample was then subjected to 4T bending. Furthermore, 4T bending is equivalent to the case of "bending inside clearance" being "4 sheets of the indicated thickness" in Table 17 of Section 13.2.2 of JIS G3322.

A wooden board having dimensions of 1.5 m×1.5 m was placed horizontal to the ground at a location at a height of 1 m from the ground outdoors at a location along the Okinawa coastline, and the sample was fixed to the side of the board opposing the ground to prevent the sample from being exposed to rain. The sample was exposed to outdoor conditions for 2 years while in this state.

The bent portion of the sample following this treatment was then observed, and corrosion status was evaluated according to the following criteria based on that result. The results are shown in Tables 9 to 12.

◎: White rust not observed at bent portion

○: White rust observed only at portion of bent portion where cracks formed

Δ: White rust observed to cover entire bent portion with some rust also spreading to portions other than bent portion x: White rust observed at bent portion and red rust also observed

TABLE 9

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| Examples | 1 | ◎ | ○ | ○ | | X | ○ | Δ | ○ | Δ |
| | 2 | ◎ | ○ | ○ | | ○ | ○ | ○ | ○ | ○ |
| | 3 | ◎ | ○ | ○ | | ◎ | ◎ | ○ | ○ | ○ |

TABLE 9-continued

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| | 4 | ◎ | ○ | ○ | | ◎ | ◎ | ○ | ○ | ○ |
| | 5 | ◎ | ○ | ○ | | ◎ | ◎ | ○ | ○ | ◎ |
| | 6 | ◎ | ○ | ○ | | ◎ | ◎ | ○ | ○ | ◎ |
| | 7 | ◎ | ○ | ○ | | ◎ | ◎ | ○ | Δ | Δ |
| | 8 | ○ | ○ | ○ | | ◎ | ○ | ○ | Δ | Δ |
| Comp. Ex. | 1 | Δ | ○ | ○ | | ○ | X | Δ | X | Δ |
| Examples | 9 | ○-Δ | X | ○ | | ◎ | ◎ | Δ | ○ | ○ |
| | 10 | ○ | ○ | ○ | | ◎ | ◎ | ○ | ○ | ○ |
| | 11 | ◎ | ○ | ○ | | ◎ | ◎ | ○ | ○ | ◎ |
| | 12 | ◎ | ○ | ○ | | ◎ | ◎ | ○ | ○ | ◎ |
| | 13 | ◎ | ○ | ○ | | ◎ | ◎ | ○ | ○. | ◎ |
| | 14 | ◎ | ○ | ○ | | ◎ | ◎ | ○ | Δ | ○ |
| | 15 | ◎ | ○ | X | | ○ | ○ | Δ | Δ | Δ |
| Comp. Ex. | 2 | X | X | ○ | | Δ | ○ | Δ | X | Δ |
| Examples | 16 | ○ | ○ | ○ | | ◎ | ◎ | ○ | ○ | ○ |
| | 17 | ◎ | ○ | ○ | | ◎ | ◎ | ○ | ○ | ◎ |
| | 18 | ◎ | ○ | ○ | | ◎ | ◎ | ○ | ○ | ◎ |

TABLE 10

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| Examples | 19 | ◎ | ○ | ○ | | ◎ | ◎ | ○ | ○ | ○ |
| | 20 | ◎ | ○ | X | | ○ | ○ | ○ | ○ | ○ |
| Comp. Ex. | 3 | X | X | X | | ○ | ○ | Δ | X | X |
| | 21 | ◎ | ○ | ○ | | X | Δ | ○ | ◎ | ○ |
| | 20 | ◎ | ○ | ○ | | ○ | ○ | ○ | ◎ | ○ |
| | 21 | ◎ | ○ | ○ | | ◎ | ◎ | ○ | ○ | ○ |
| | 22 | ◎ | ○ | ○ | | ◎ | ◎ | ○ | ○ | ○ |
| | 23 | ◎ | ○ | ○ | | ○ | ○ | ○ | ◎ | ◎ |
| | 24 | ◎ | ○ | ○ | | ◎ | ◎ | ○ | ○ | ○ |
| | 25 | ◎ | ○ | ○ | | ◎ | ◎ | ○ | ○ | ○ |
| | 26 | ◎ | ○ | ○ | | ○ | ○ | ○ | ◎ | ○ |
| | 27 | ◎ | ○ | ○ | | ◎ | ◎ | ○ | ○ | ◎ |
| | 28 | ◎ | ○ | ○ | | ◎ | ◎ | ○ | ○ | ◎ |
| | 29 | ◎ | ○ | ○ | | ◎ | ◎ | ○ | ○ | ○ |
| | 30 | ○ | ○ | ○ | | ◎ | ◎ | ○ | Δ | ○ |
| | 31 | ◎ | ○ | ○ | | ○ | ○ | ○ | ○ | ◎ |
| | 32 | ◎ | ○ | ○ | | ◎ | ◎ | ○ | ○ | ◎ |
| | 33 | ○ | ○ | ○ | | ◎ | ◎ | ○ | Δ | ○ |
| | 34 | ◎ | ○ | ○ | | ○ | ○ | ○ | ◎ | ◎ |
| | 35 | ◎ | ○ | ○ | | ◎ | ◎ | ○ | ○ | ○ |

TABLE 11

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| Examples | 36 | ○ | ○ | ○ | | ◎ | ◎ | ○ | ○ | ○ |
| | 37 | ◎ | ○ | ○ | | ○ | ○ | ○ | ◎ | ◎ |
| | 38 | ◎ | ○ | ○ | | ◎ | ◎ | ○ | ○ | ◎ |
| | 39 | ○ | ○ | ○ | | ◎ | ◎ | ○ | ○ | ◎ |
| | 40 | ◎ | ○ | ○ | | ○ | ○ | ○ | ◎ | ◎ |
| | 41 | ◎ | ○ | ○ | | ◎ | ◎ | ○ | ○ | ◎ |
| | 42 | ◎ | ○ | ○ | | ◎ | ◎ | ○ | ○ | ○ |
| | 43 | ○ | ○ | ○ | | ◎ | ◎ | ○ | ○ | ○ |

TABLE 11-continued

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| Comp. Ex. | 4 | X | ○ | X | | ⊚ | ⊚ | X | X | Δ |
| Examples | 44 | ○-Δ | X | ○ | | ⊚ | ⊚ | Δ | ○ | ○ |
| | 45 | ○-Δ | X | ○ | | ⊚ | ⊚ | Δ | ○ | ○ |
| | 46 | ○ | ○ | ○ | | ⊚ | ⊚ | ○ | ○ | ○ |
| | 47 | ⊚ | ○ | ○ | | ⊚ | ⊚ | ○ | ○ | ⊚ |
| | 48 | ⊚ | ○ | ○ | | ⊚ | ⊚ | ○ | ○ | ○ |
| | 49 | ⊚ | ○ | ○ | | ⊚ | ⊚ | ○ | ○ | ○ |
| | 50 | ⊚ | ○ | ○ | | ⊚ | ⊚ | ○ | ○ | ○ |
| | 51 | ⊚ | ○ | ○ | | ⊚ | ⊚ | ○ | ○ | ○ |
| | 52 | ⊚ | ○ | ○ | | ⊚ | ⊚ | ○ | ○ | ○ |
| | 53 | ⊚ | ○ | X | | ○ | ○ | Δ | ○ | ○ |
| | 54 | ⊚ | ○ | ○ | | ⊚ | ⊚ | ○ | ○ | ○ |

TABLE 12

| | | Appearance | | | | Naked corrosion resistance | Corrosion resistance after coating | | Bending workability | Corrosion resistance after bending |
|---|---|---|---|---|---|---|---|---|---|---|
| | | Wrinkling | Running | Dross | Other | | Cut ends | Coated surface | | |
| Examples | 55 | ⊚ | ○ | ○ | | ⊚ | ⊚ | ○ | ⊚ | ⊚ |
| | 56 | ⊚ | ○ | ○ | | ⊚ | ⊚ | ○ | ⊚ | ⊚ |
| | 57 | ⊚ | ○ | ○ | | ⊚ | ⊚ | ○ | ⊚ | ⊚ |
| | 58 | ⊚ | ○ | ○ | | ⊚ | ⊚ | ○ | ○ | ⊚ |
| | 59 | ⊚ | ○ | ○ | | ⊚ | ○ | ○ | ⊚ | ⊚ |
| | 60 | ⊚ | ○ | ○ | | ⊚ | ○ | ○ | ⊚ | ⊚ |
| | 61 | ⊚ | ○ | ○ | | ⊚ | ⊚ | ○ | ○ | ○ |
| | 62 | ⊚ | ○ | ○ | | ⊚ | ⊚ | ○ | ○ | ○ |
| | 63 | ⊚ | ○ | ○ | | ○ | ○ | ○ | ⊚ | ⊚ |
| | 64 | ⊚ | ○ | ○ | | ⊚ | ⊚ | ○ | ○ | ⊚ |
| | 65 | ⊚ | ○ | ○ | | ⊚ | ⊚ | ○ | ○ | ⊚ |
| | 66 | ⊚ | ○ | ○ | | ⊚ | ⊚ | ○ | ○ | ⊚ |
| | 67 | ⊚ | ○ | ○ | | ⊚ | ⊚ | ○ | ○ | ⊚ |
| | 68 | ⊚ | ○ | ○ | | ⊚ | ⊚ | ○ | ○ | ⊚ |
| | 69 | ⊚ | ○ | ○ | | ⊚ | ⊚ | ○ | ○ | ⊚ |
| | 70 | ⊚ | ○ | ○ | | ⊚ | ⊚ | ○ | ○ | ○ |
| | 71 | ⊚ | ○ | ○ | | ⊚ | ⊚ | ○ | ○ | ⊚ |
| | 72 | ⊚ | ○ | ○ | Spangle coarsening | ○ | ⊚ | ○ | ○ | ○ |
| | 73 | ⊚ | ○ | X | | Δ | ○ | ○ | ○ | Δ |

(Evaluation of Overaging Treatment)

Overaging treatment was carried out on a coil of the hot-dipped sheet steel of Example 5 while changing the holding temperature t (° C.) and holding time y (hr). The results were evaluated as indicated below.

⊚: No adhesion between plating layers in coil and improved workability

Figure 10:
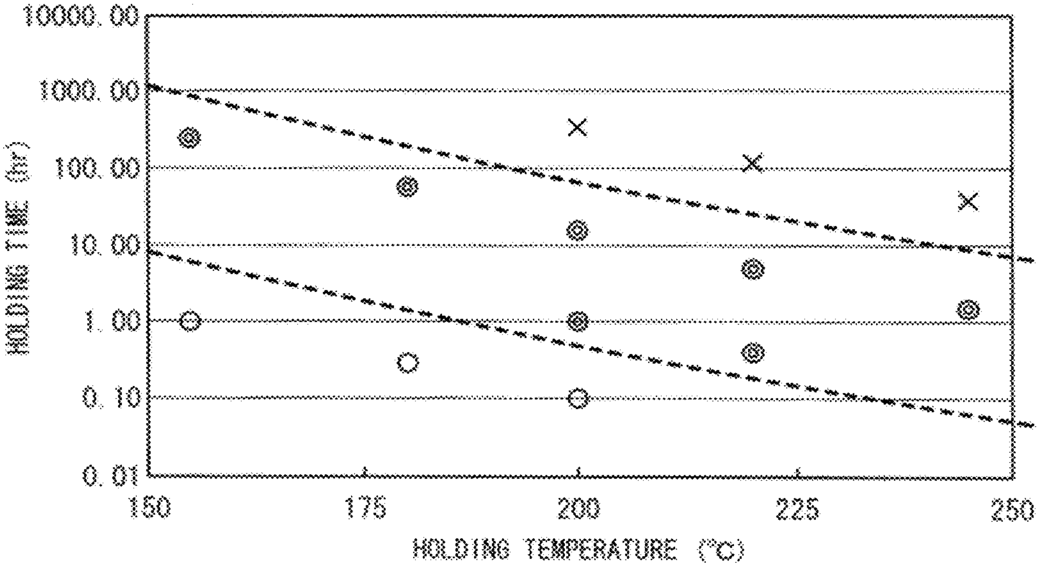
FIG. 10 is a graph indicating the results of evaluating overaging treatment for a hot-dipped sheet steel of Example 5.

○: No adhesion between plating layers in coil, but no improvement in workability x: Adhesion between plating layers in coil The results are indicated in the graph of FIG. 10. The horizontal axis of this graph indicates holding temperature t (° C.), while the vertical axis indicates holding time y (hr). The evaluation results for each holding temperature and holding time are shown at those locations corresponding to the holding temperature t (° C.) and holding time y (hr) used during testing shown in the graph. The area demarcated by broken lines in the graph is the area where the holding temperature t (° C.) and holding time y (hr) satisfy the following formula (1).

$$5.0\times10^{22}\times t^{-10.0}\leq y\leq 7.0\times10^{24}\times t^{-10.0} \quad (1)$$

(where 150≤t≤250)

REFERENCE SIGNS LIST

1 Steel substrate
2 Hot-dip plating bath

The invention claimed is:

1. A hot-dipped steel comprising a steel substrate with an aluminum-zinc alloy plating layer formed thereon, said aluminum-zinc alloy plating layer containing Al, Zn, Si and Mg as constituent elements thereof, wherein said aluminum-zinc alloy plating layer contains 0.1% to 10% by weight of Mg, said aluminum-zinc alloy plating layer contains 0.2% to 15% by volume of an Si—Mg phase, the weight ratio of Mg in the Si—Mg phase to the total weight of Mg is 3% or more, and the aluminum-zinc alloy plating layer further contains 0.02% by weight to 1.0% by weight of Cr as a constituent element thereof, protrusions having height of greater than 200 μm and steepness greater than 1.0 are no longer present on a surface of the aluminum-zinc alloy plating layer.

2. The hot-dipped steel according to claim 1, wherein said aluminum-zinc alloy plating layer contains 25% to 75% by weight of Al, and 0.5% to 10% by weight of Si with respect to the weight of Al; and the weight ratio of Si to Mg is between 100:50 and 100:300.

3. The hot-dipped steel according to claim 1, wherein the aluminum-zinc alloy plating layer further contains at least one of Ti and B, and total amount of Ti and B is within a range of 0.0005% to 0.1% by weight.

4. The hot-dipped steel according to claim 1, wherein the aluminum-zinc alloy plating layer further contains 1 ppm to 1000 ppm by weight of Sr.

5. The hot-dipped steel according to claim 1, wherein the Mg content in any region having a size of 4 mm in diameter and a depth of 50 nm in an outermost layer of the aluminum-zinc alloy plating layer having a depth of 50 nm is less than 60% by weight.

6. The hot-dipped steel according to claim 1, wherein the content of Cr in an outermost layer of the aluminum-zinc alloy plating layer having a depth of 50 nm is within a range of 100 ppm by weight to 500 ppm by weight.

7. The hot-dipped steel according to claim 1, wherein an alloy layer containing Al and Cr is interposed between the aluminum-zinc alloy plating layer and the steel substrate, and the ratio of the weight proportion of Cr in the alloy layer to the weight ratio of Cr in the aluminum-zinc alloy plating layer is within a range of 2 to 50.

8. The hot-dipped steel according to claim 1, wherein said aluminum-zinc alloy plating layer contains said Si—Mg phase in the surface thereof at a surface area ratio of 30% or less.

9. A method of producing the hot-dipped steel according to claim 1, said method comprising:

preparing a hot-dip plating bath containing an alloy composition containing,

25% to 75% by weight of Al, 0.1% to 10% by weight of Mg, 0.02% to 1.0% by weight of Cr, 0.5% to 10% by weight, based on Al, of Si, 1 ppm to 1000 ppm by weight of Sr, 0.1% to 1.0% by weight of Fe, the remainder being Zn, the weight ratio of Si to Mg being 100:50 to 100:300;

passing a steel substrate through said hot-dip plating bath to deposit a hot-dip plating metal on a surface thereof; and solidifying said hot-dip plating metal to form an aluminum-zinc alloy plating layer on the surface of the steel substrate, wherein said aluminum-zinc alloy plating layer contains 0.2% to 15% volume of an Si—Mg phase, wherein the weight ratio of Mg in the Si—Mg phase to the total weight of Mg is 3% or more, and wherein protrusions having height of greater than 200 μm and steepness greater than 1.0 are no longer present on a surface of the aluminum-zinc alloy plating layer.

10. The method according to claim 9, wherein the hot-dip plating bath further contains 100 ppm to 5000 ppm by weight of Ca.

11. The method according to claim 9, wherein the hot-dip plating bath further contains at least one of Ti and B within a range 0.0005% to 0.1% by weight.

12. The method according to claim 9, wherein said hot-dip plating bath is maintained, at a temperature not exceeding by 40° C. above a solidification starting temperature of said alloy composition.

13. The method according to claim 9, wherein said steel substrate is transferred from said hot-dip plating bath to a non-oxidative atmosphere or low oxidative atmosphere, after which a gas wiping process is made to adjust an amount of the hot-dip plating metal deposited on said steel substrate in said non-oxidative atmosphere or low oxidative atmosphere before said hot-dip plating metal is solidified.

14. The method according to claim 9, further including a step of holding said steel substrate coated with the aluminum-zinc alloy plating layer, at a holding temperature t (° C.) for a holding time y (hr) defined by the following formula (I):

$$5.0\times10^{22}\times t^{-10.0}\leq y\leq 7.0\times10^{24}\times t^{-10.0} \quad \text{(I)}$$

(where $150\leq t\leq 250$).

* * * * *